(12) United States Patent
Chida

(10) Patent No.: US 7,088,379 B2
(45) Date of Patent: Aug. 8, 2006

(54) IMAGE FORMING APPARATUS AND INK RIBBON SET

(75) Inventor: Susumu Chida, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 464 days.

(21) Appl. No.: 10/396,375

(22) Filed: Mar. 26, 2003

(65) Prior Publication Data

US 2003/0184824 A1    Oct. 2, 2003

(30) Foreign Application Priority Data

Mar. 28, 2002  (JP)  ............................. 2002-091148
Mar. 29, 2002  (JP)  ............................. 2002-093547

(51) Int. Cl.
B41J 32/00   (2006.01)
(52) U.S. Cl. ...................... 347/217; 347/214; 400/207
(58) Field of Classification Search .................... None
See application file for complete search history.

(56) References Cited

U.S. PATENT DOCUMENTS 6,798,434 B1 * 9/2004 Shibata et al. .............. 347/214

FOREIGN PATENT DOCUMENTS

| JP | A 6-179278 | 6/1994 |
| JP | A 11-243465 | 9/1999 |
| JP | A 2000-158777 | 6/2000 |
| JP | A 2001-105625 | 4/2001 |
| WO | WO 00/32406 | 6/2000 |

OTHER PUBLICATIONS

U.S. Appl. No. 10/396,422, filed Mar. 26, 2003, Kato et al.
U.S. Appl. No. 10/395,141, filed Mar. 25, 2003, Isozaki et al.

* cited by examiner

Primary Examiner—Huan Tran
(74) Attorney, Agent, or Firm—Oliff & Berridge, PLC

(57) ABSTRACT

When some trouble occurs to a facsimile apparatus 1 that reads component-identification information of an ink ribbon cartridge 60 and it is impossible to read the component-identification information even if the ink ribbon cartridge 60 is a standard product, a permanent release mode is set to permanently prohibit an identification information reading processing (S24). On the other hand, when any trouble does not occur to the facsimile apparatus 1 but some trouble occurs to the ink ribbon cartridge 60, it is impossible to read the component-identification information so long as the ink ribbon cartridge 60 is used. Therefore, a temporary release mode is set to temporarily prohibit the identification information reading processing (S24). Accordingly, it becomes possible to reduce an economical burden on a user and to perform a printing operation with favorable printing quality.

30 Claims, 13 Drawing Sheets

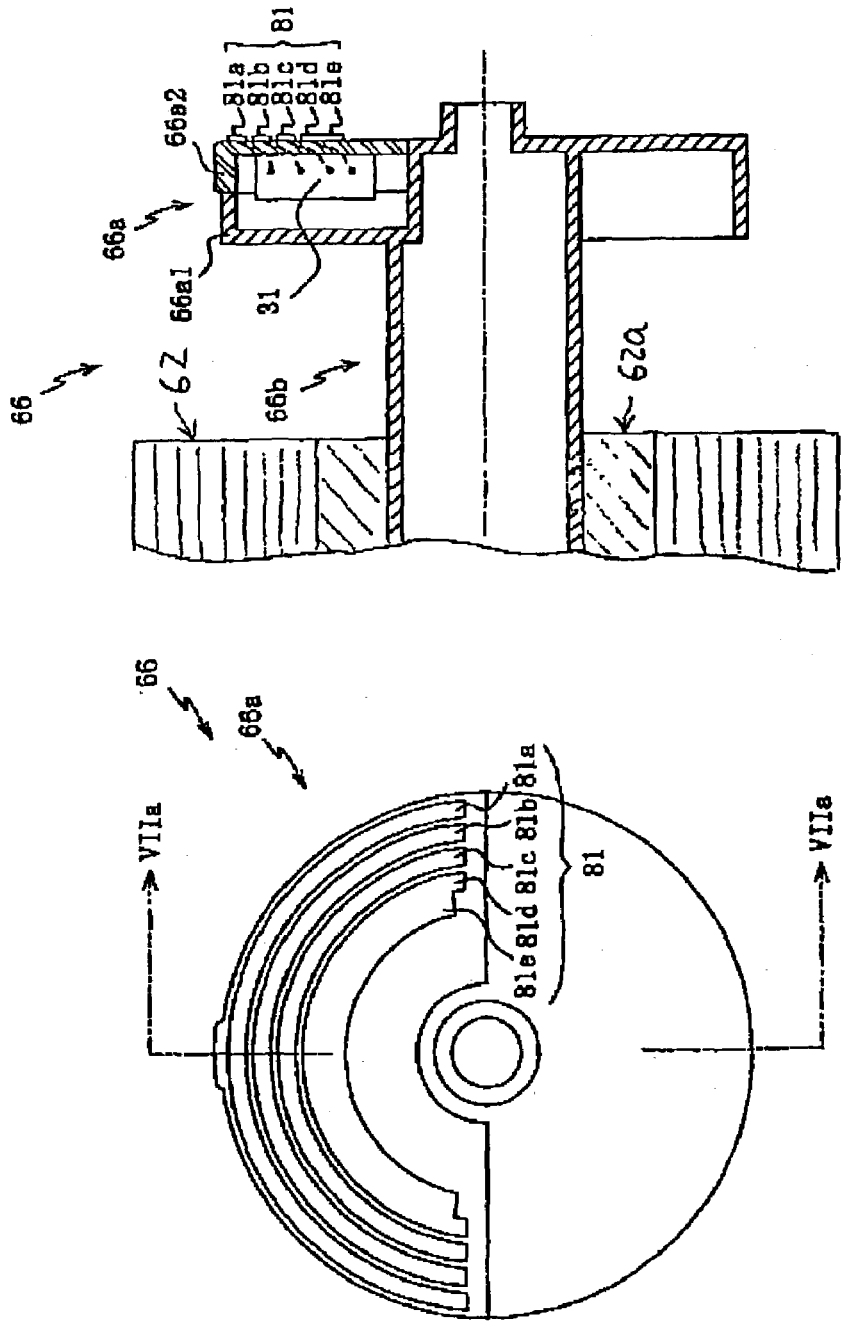

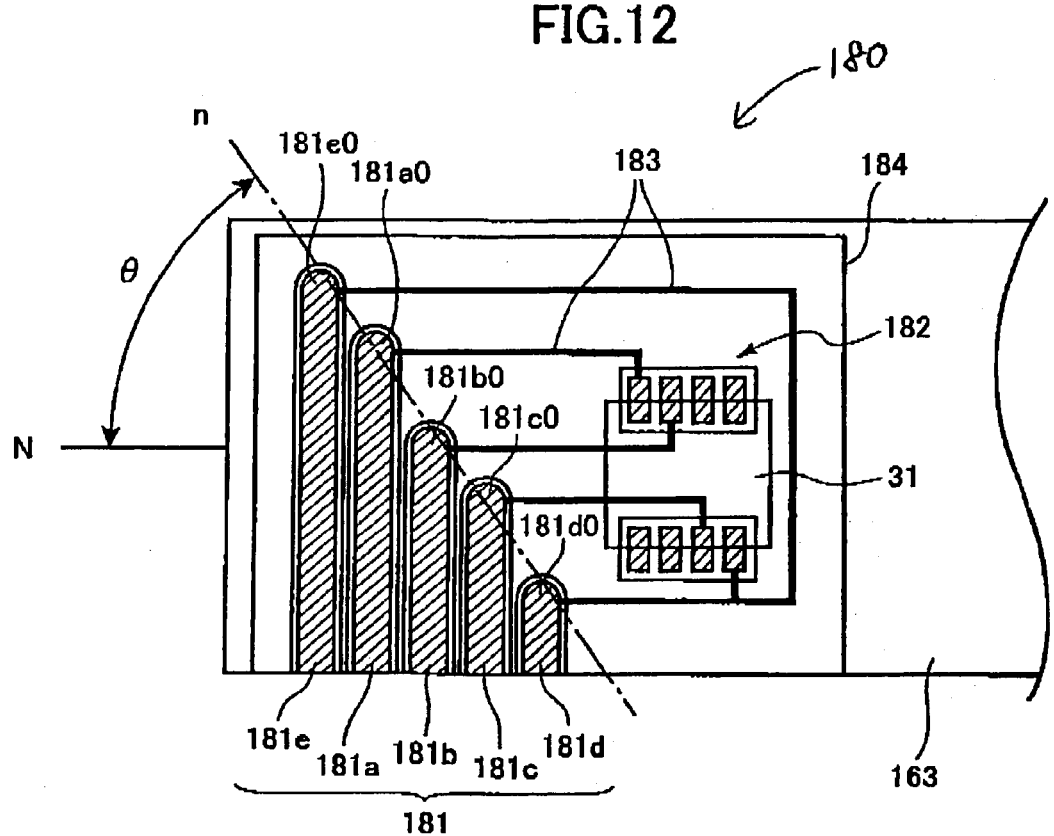

IMAGE FORMING APPARATUS AND INK RIBBON SET

BACKGROUND OF THE INVENTION

1. Field of the Invention

The present invention relates to an image forming apparatus.

2. Description of Related Art

Conventionally, there has been provided an image forming apparatus (such as a printer or a facsimile apparatus) that forms an image on a recording sheet that is a recording medium using an ink ribbon. This image forming apparatus forms the image by pressing the ink ribbon against a recording sheet using a heating unit of a recording head to cause ink of the ink ribbon thermally-melted by heat generated by the heating unit to undergo thermocompression bonding onto the recording sheet. In this image forming apparatus, the ink ribbon is constituted as a cartridge and the ink ribbon cartridge is constructed detachably attachable to the main body of the image forming apparatus. Thus, when the ink ribbon has been consumed up to its trailing edge, a user can replace the ink ribbon cartridge by himself/herself.

SUMMARY OF THE INVENTION

An imitation product of the ink ribbon cartridge can be easily produced that resembles the ink ribbon cartridge by, for instance, replacing an ink ribbon with the one that is not a standard product. If a user carelessly uses such a non-standard product, there is a danger that not only printing quality may be degraded but also the recording head may be damaged.

More specifically, for the image forming apparatus, a standard ink ribbon, which is applicable to the image forming apparatus and whose characteristics, such as durability and quality, satisfy a predetermined standard, is manufactured by a manufacturer of image forming apparatuses or a manufacturer of ink ribbons, and supplied to consumers to ensure that a print operation can be performed satisfactorily.

That is, usually, the image forming apparatus is constituted so that its product quality is guaranteed assuming that a standard ink ribbon satisfying the above-mentioned standard of characteristics is mounted. Therefore, if a non-standard ink ribbon, which is not determined as the standard ink ribbon and therefore whose characteristic may possibly fail to satisfy the standard is used, a satisfactory print quality will not possibly be attained in the image forming apparatus and, moreover, a print head provided in the image forming apparatus will possibly be affected adversely, a service life of the ink head will possibly be reduced, or jam of the ink ribbon will possibly occur. In addition, even if a standard ink ribbon whose usable term has expired long time ago is used, even if the ink ribbon is a standard one, the quality characteristics of the ink ribbon possibly changes and causes the above-described deficiencies.

In view of this problem, it is possible to conceive an image forming apparatus having a construction where the ink ribbon cartridge has identification information, the identification information is read therefrom, it is judged whether or not the mounted ink ribbon cartridge is a standard product and, if it is judged that the ink ribbon cartridge is not a standard product, predetermined warning information or the like is issued to a user. In more detail, barcode information is printed on the outer peripheral surface of a rotary spool around which an ink ribbon is wound, the rotary spool is rotated prior to printing, and the barcode information is read using an optical sensor attached to the main body of the image forming apparatus.

With this image forming apparatus, it becomes possible to judge whether or not the mounted ink ribbon cartridge is a standard product prior to a printing operation and to issue predetermined warning information to a user or to prohibit a printing operation if the ink ribbon cartridge is not a standard product. Accordingly, it becomes possible to prevent degradation of printing quality, breakage of the recording head, and the like from occurring.

It is preferable that a user can grasp various information of an ink ribbon mounted on the image forming apparatus prior to a printing operation, in order to attain his/her desired printing performance. It is therefore preferable that the barcode information includes various information on the subject ink ribbon and that the barcode information is read prior to printing.

In the image forming apparatus described above, however, when some trouble occurs to a reading apparatus for reading the identification information of the ink ribbon cartridge, for instance, there is a danger that even if the mounted ink ribbon cartridge is a standard product, this ink ribbon cartridge is erroneously recognized as a non-standard product. In this case, irrespective of a fact that it is possible to perform a printing operation without any problem, warning information will be issued each time a printing operation is performed, which is an inconvenient situation to a user. Also, if the user wishes to avoid such inconveniences, he/she is required to perform repair, replacement, or the like of the apparatus, which places an excess economical burden on the user.

Also, in the image forming apparatus that uses the barcode information described above, when judging whether or not the mounted ink ribbon cartridge is a standard product, it is required to rotate the rotary spool by an amount that is at least equal to the print length of the barcode information. The ink ribbon conveyed along with this rotation is not used for printing, so that the ink ribbon is wastefully conveyed with the operation only for reading the barcode information. Consequently, the consumed amount of the ink ribbon increases by the conveyed ink ribbon length.

Taking the above-described problems into account, it is an object of the present invention to provide an image forming apparatus and an ink ribbon set that are capable of reducing an economical burden on a user, performing a printing operation with favorable printing quality, and reducing wasteful consumption of an ink ribbon.

In order to attain the above and other objects, the present invention provides an ink ribbon set including an ink ribbon coated with ink, a rotary spool around which the ink ribbon is wound, and an information holding portion that is provided on the rotary spool, the information holding portion including a nonvolatile memory storing predetermined information and a reading terminal formed on a surface of the rotary spool and connected to the nonvolatile memory, the reading terminal being formed on the surface of the rotary spool by a central angle $\alpha$ around a rotational axis of the rotary spool, the central angle $\alpha$ being smaller than 360°.

The present invention also provides an ink ribbon cartridge including a holder, and an ink ribbon set detachably mounted on the holder, the ink ribbon set including, an ink ribbon coated with ink, a rotary spool around which the ink ribbon is wound, and an information holding portion that is provided on the rotary spool, the information holding portion including a nonvolatile memory storing predetermined information and a reading terminal formed on a surface of the rotary spool and connected to the nonvolatile memory, the reading terminal being formed on the surface of the rotary spool by a central angle $\alpha$ around a rotational axis of the rotary spool, the central angle $\alpha$ being smaller than 360°.

The present invention also provides an image forming apparatus including an ink ribbon set having an ink ribbon coated with ink, a rotary spool around which the ink ribbon is wound, and an information holding portion that is provided on the rotary spool, the information holding portion including a nonvolatile memory storing predetermined information and a reading terminal formed on a surface of the rotary spool and connected to the nonvolatile memory, the reading terminal being formed on the surface of the rotary spool by a central angle $\alpha$ around a rotational axis of the rotary spool, the central angle $\alpha$ being smaller than 360°, a driving portion of rotating the rotary spool to convey the ink ribbon of the ink ribbon set in a forward direction, an image forming portion forming an image on a recording medium using the ink ribbon conveyed by the driving portion, an obtaining portion that is disposed opposing the rotary spool and obtains the information from the information holding portion, a determining unit performing judgment based on the information obtained by the obtaining portion, and a rewinding portion rotating, when the driving portion has rotated the rotary spool in the forward direction to let the obtaining portion obtain the information, the rotary spool in a reverse direction to rewind the ink ribbon by a rewinding length that corresponds to a winding length of the ink ribbon conveyed by the forward rotation.

The present invention also provides an image forming apparatus including a mount portion to which an ink ribbon set is detachably mounted, the ink ribbon set including an ink ribbon coated with ink, a rotary spool around which the ink ribbon is wound, and an information holding portion that is provided on the rotary spool and holds information of the ink ribbon set, a driving portion of rotating the rotary spool to convey the ink ribbon of the ink ribbon set in a forward direction, an image forming portion forming an image on a recording medium using the ink ribbon conveyed by the driving portion, an obtaining portion that is disposed opposing the rotary spool and obtains the information from the information holding portion, a determining unit performing judgment based on the information obtained by the obtaining portion, and a rewinding portion rotating, when the driving portion has rotated the rotary spool in the forward direction to let the obtaining portion obtain the information, the rotary spool in a reverse direction to rewind the ink ribbon by a rewinding length that corresponds to a winding length of the ink ribbon conveyed by the forward rotation.

The present invention also provides an image forming apparatus including a receiving portion detachably receiving a printing component, the printing component having a printing medium and being provided with a portion having information of the printing component, a printing portion forming an image on a recording medium using the printing medium supplied from the printing component, a judging unit detecting the information and performing a judgment based on a result of the detection, an error operation unit executing an error processing selectively based on the judgment result, and a mode setting unit setting a first prohibiting mode, in which the judging unit is prohibited from executing the judgment, thereby setting the error operation unit inoperable.

BRIEF DESCRIPTION OF THE DRAWINGS

In the drawings:

FIG. 7(a) is a right side view of a right-side supply side spool and viewed from the right side thereof in FIG. 5;

FIG. 7(b) is a side cross-sectional view of the supply side spool taken along a line VIIa—VIIa in FIG. 7(a);

FIG. 12 is an enlarged view showing an electrode pattern formed on a take-up roll core of FIG. 11;

DETAILED DESCRIPTION OF THE PREFERRED EMBODIMENTS

Figure 1:
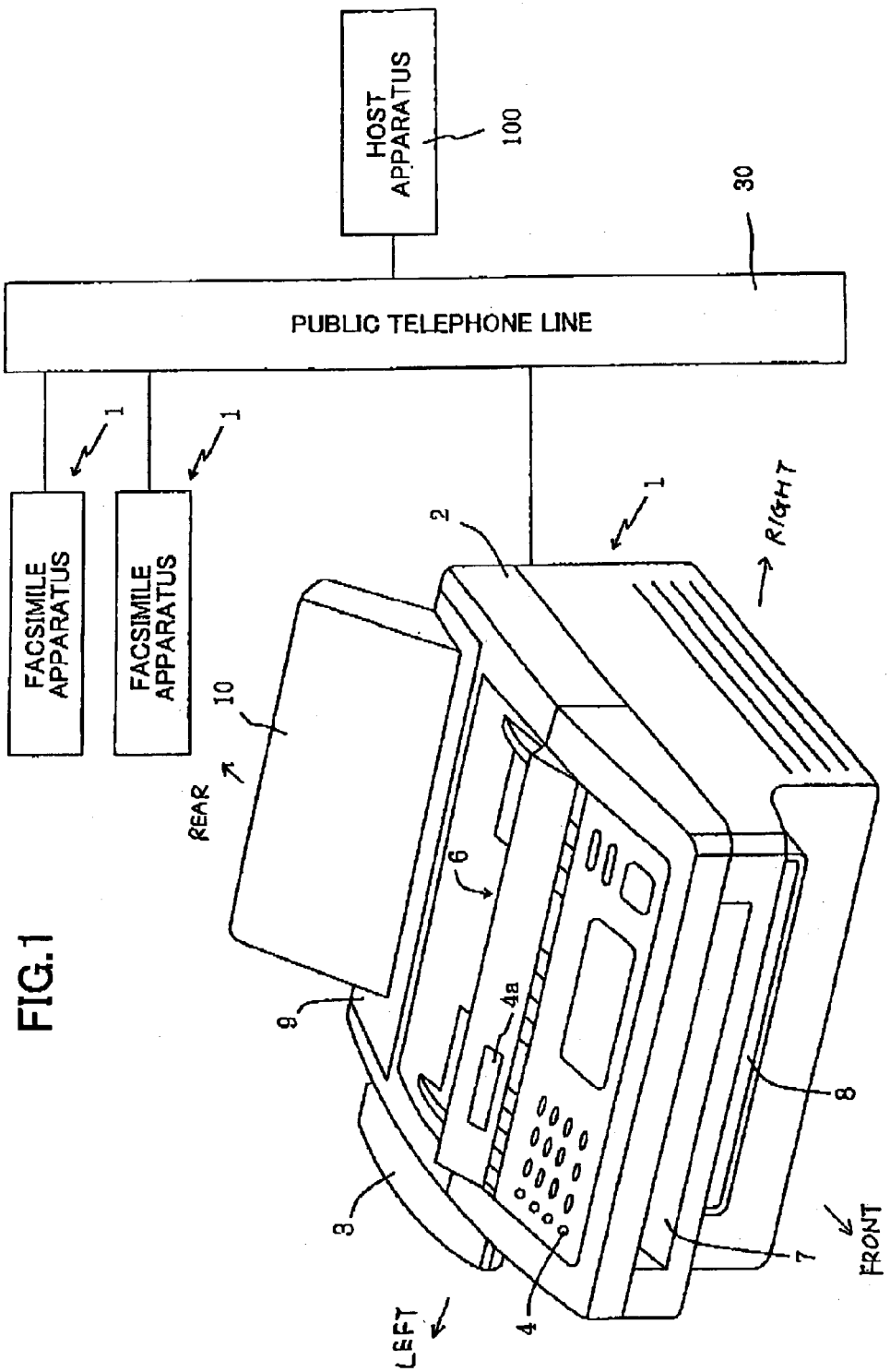
FIG. 1 shows facsimile apparatuses that are each an embodiment of an image forming apparatus of the present invention and schematically shows a state where the facsimile apparatuses are connected to a host apparatus.

A preferred embodiment of the present invention will now be described with reference to the accompanying drawings. FIG. 1 schematically shows a state where facsimile apparatuses 1 that are each an embodiment of the present invention is connected to a host apparatus 100. As shown in FIG. 1, a plurality of facsimile apparatuses 1 are connected to the host apparatus 100 through a public telephone line 30 so that bi-directional communication is possible. As a result, it is possible to collectively manage the plurality of facsimile apparatuses 1 from the host apparatus 100 installed at a remote site.

Each facsimile apparatus 1 reads an image or the like from an original and transmits data of the image to another facsimile apparatus 1 through the telephone line 30 as facsimile data. In addition, the facsimile apparatus 1 receives facsimile data transmitted from another facsimile apparatus 1 through the telephone line 30 and forms an image on recording paper. The host apparatus 100 manages the plurality of facsimile apparatuses 1 connected to the host apparatus 100 from a remote site and is composed of an ordinary large-sized computer.

In a side portion of a main body 2 of the facsimile apparatus 1, a handset 3 is placed on a hook (not shown), and an operation panel 4 including a plurality of buttons is provided in a front portion of the upper surface of the main body 2. The operation panel 4 is provided with various kinds of buttons such as numeral buttons from "0" to "9" and a start button and, when these buttons are depressed, various kinds of operations are performed. In a left-rear portion of the operation panel 4, a liquid crystal display (hereinafter referred to as the "LCD") 4a is provided and displays the setting state of the facsimile apparatus 1, various kinds of operation messages, and the like as necessary. When an ink ribbon cartridge 60 mounted to the facsimile apparatus 1 is not a standard product, for instance, a warning message is displayed on the LCD 4a.

An original insertion opening 6 is provided at the rear of the operation panel 4. An original to be transmitted by facsimile is inserted into the original insertion opening 6 so that an original surface faces down. Then, after reading is performed, the original is discharged from an original discharging opening 7 provided below the operation panel 4 on the front surface of the main body 2. A recording paper holder mount portion 9 is provided at the rear of the original insertion opening 6. In addition, a recording paper holder 10 is detachably attached to the recording paper holder mount portion 9. The recording paper holder 10 is capable of receiving a plurality of sheets of recording paper in a stacked manner. The recording paper fed from the recording paper holder 10 and applied to printing is discharged from a recording paper discharging opening 8 provided below the original discharging opening 7.

In addition to functions as an ordinary facsimile apparatus, the facsimile apparatus 1 has a printer function with which print data transmitted from a personal computer, a word processor, or the like through a printer cable or wireless communication using infrared rays or the like is received, so that an image is formed in accordance with the received data.

Figure 2:
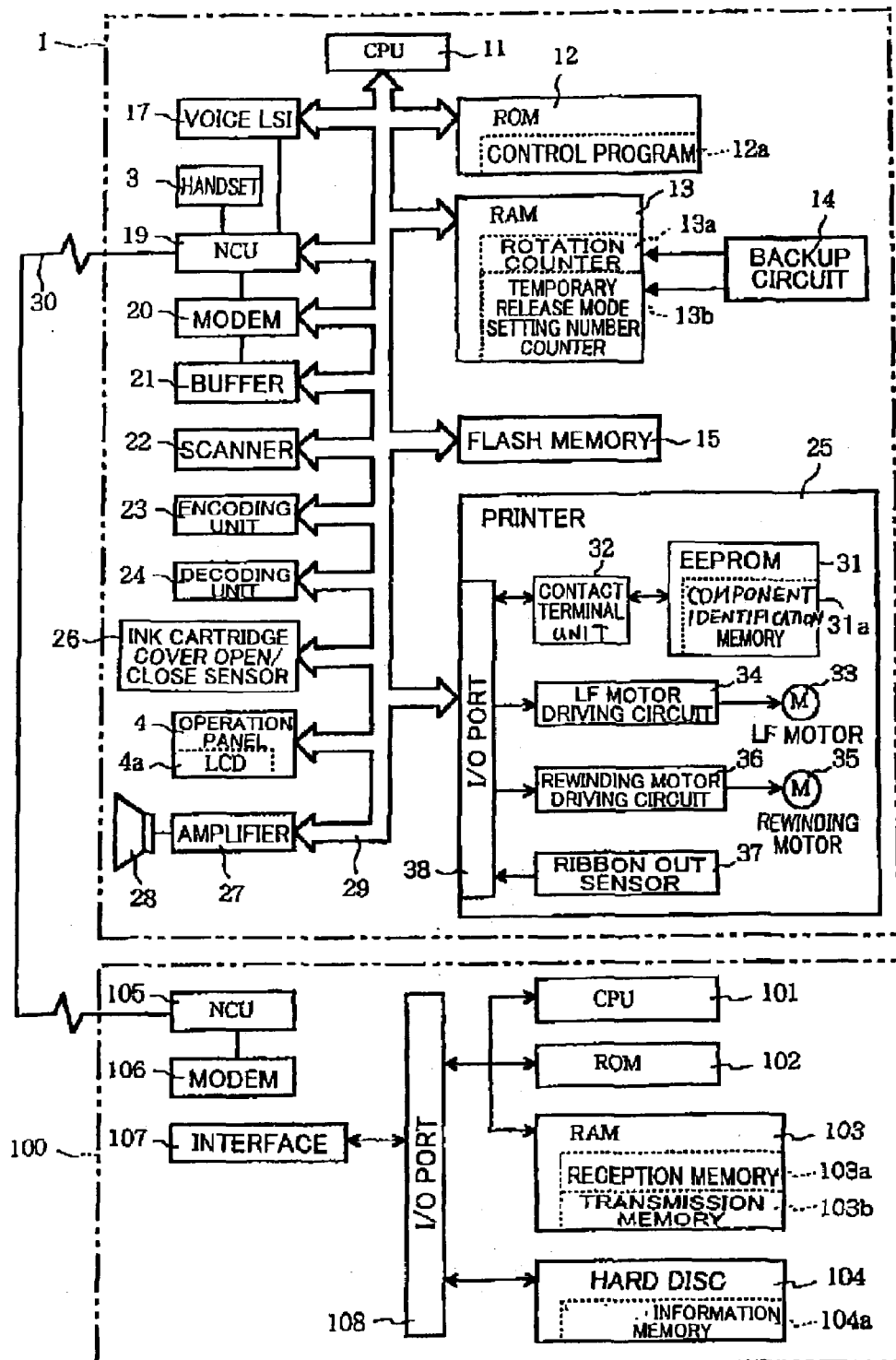
FIG. 2 is a block diagram showing electrical constructions of the facsimile apparatus and the host apparatus.

FIG. 2 is a block diagram showing electrical constructions of the facsimile apparatus 1 and the host apparatus 100. The facsimile apparatus 1 is provided with a CPU 11, a ROM 12, a RAM 13, a flash memory 15, a voice LSI 17, a network control unit (hereinafter referred to as the "NCU") 19, a modem 20, a buffer 21, a scanner 22, an encoding unit 23, a decoding unit 24, a printer 25, the operation panel 4, an amplifier 27, and the like, with these construction elements being connected to each other through a bus line 29.

The CPU 11 executes data communication, such as a facsimile operation or a telephone operation, by controlling each construction element connected through the bus line 29 in accordance with various kinds of signals transmitted and received through the NCU 19. The ROM 12 is an unrewritable memory storing a control program 12a for executing the processing in flowcharts shown in FIGS. 8 to 10.

Also, the ROM 12 prestores reference data which is composed of a plurality of sets of component-identification information (hereinafter referred to as "component-ID information") of a plurality of standard ink ribbon sets 60S. By referring to this reference data, the CPU 11 judges whether or not the mounted ink ribbon cartridge 60 is a standard product that includes a standard ink ribbon set 60S having a standard ink ribbon 62. When a new ink ribbon cartridge 60 is mounted, the CPU 11 reads the component-ID information from an EEPROM 31 in the ink ribbon cartridge 60 and the reference data from the ROM 12, and compares the component-ID information with the reference data, thereby judging whether or not the mounted ink ribbon cartridge 60 is a standard product.

Also, the ROM 12 stores apparatus-identification information (hereinafter referred to as "apparatus-ID information") and password information that have been uniquely set for the facsimile apparatus 1. The apparatus-ID information is a number composed of 10 digits, for instance. During a release mode setting processing to be described later with reference to FIG. 10, this apparatus-ID information is read as one parameter. Note that the apparatus-ID information is also written on a seal affixed to the undersurface or the like of the facsimile apparatus 1, thereby allowing a user to visually read the apparatus-ID information.

The RAM 13 is a memory for storing various kinds of data and is provided with a rotation counter 13a and a temporary release mode setting number counter 13b. Also, a backup circuit 14 is connected to the RAM 13. The backup circuit 14 allows the RAM 13 to hold image data or the like received from another facsimile apparatus or captured by the scanner 22 even after power shutdown.

Figure 9:
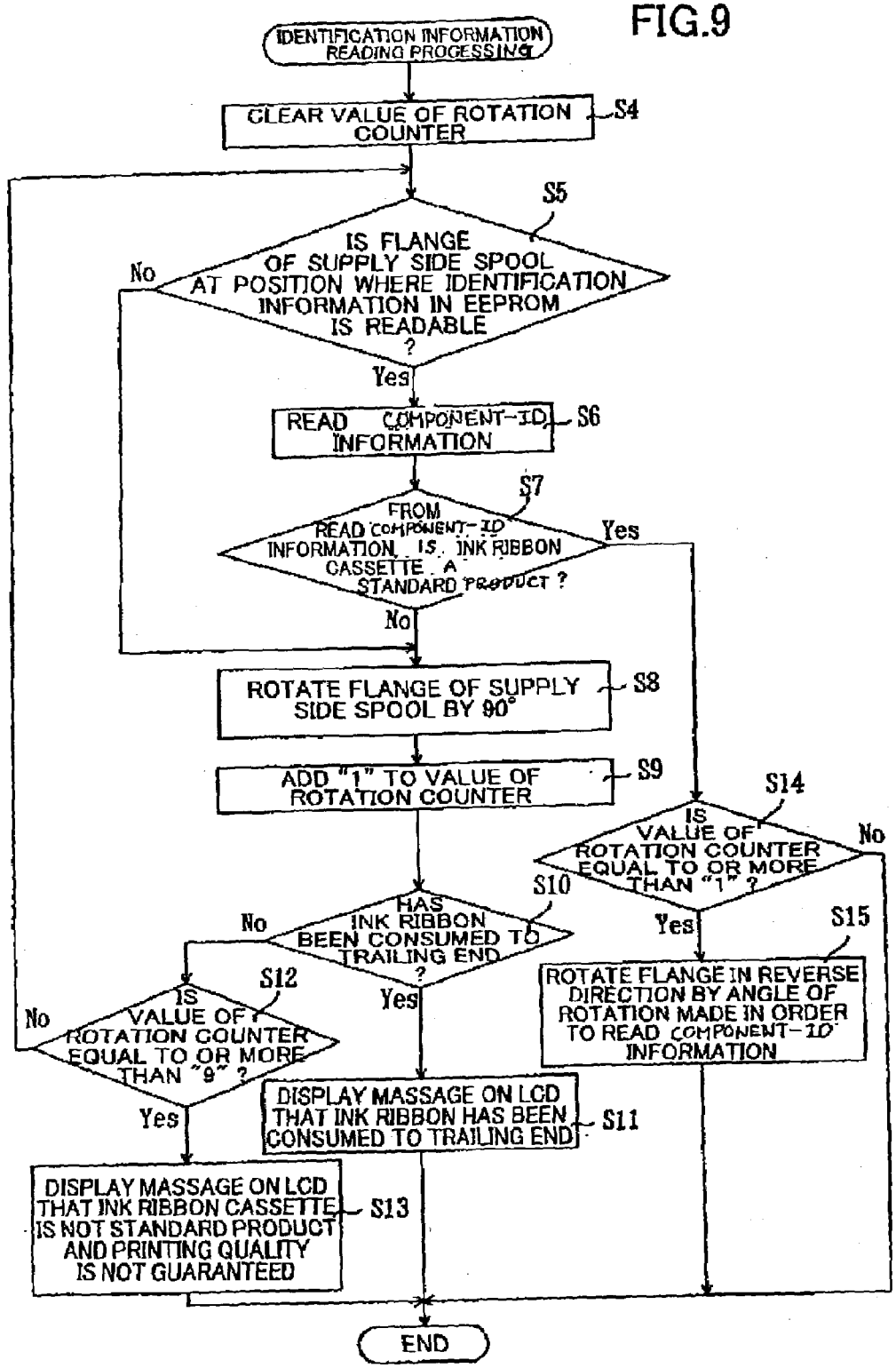
FIG. 9 is a flowchart of the identification information reading processing.

The rotation counter 13a is a memory for storing the number of 90°-rotations (a symbol "°" stands for "degrees") made by a right-side supply side spool 66 (see FIG. 5), and is updated within a range of from "0" to "9" during an identification information reading processing to be described later (see FIG. 9). If the number of 90°-rotations made by the supply side spools 65 and 66 is "0", for instance, the value of the rotation counter 13a is "0". When the supply side spools 65 and 66 are rotated three times by the rotation angle of each rotation of 90°, which makes 270° in total and the value of the rotation counter 13a is updated to "3". The temporary release mode setting number counter 13b is a memory for storing the number of times that a temporary release mode has been set and a value of "1" is added to the value of the temporary release mode setting number counter 13b each time the temporary release mode is set. The number stored in the temporary release mode setting number counter 13b is used as an additional parameter that is changed each time the temporary release mode is set.

The flash memory 15 is a memory for storing data received by facsimile when a free space of the RAM 13 is less than a predetermined amount. That is, the data received by facsimile is stored in either the RAM 13 or the flash memory 15.

The voice LSI 17 converts an analog voice signal received by the NCU 19 into a digital voice signal. The voice LSI 17 also converts a digital voice signal generated within the facsimile apparatus 1 into an analog voice signal, and outputs the voice signal to the NCU 19. The modem 20 modulates/demodulates image data and transmits the image data, and transmits/receives various kinds of procedure signals for transmission control.

The buffer 21 temporarily stores encoded image data to be exchanged with a remote facsimile apparatus, or image data read from an original by the scanner 22. The image data is stored in the RAM 13 or the flash memory 15 through the buffer 21. Also, the image data to be outputted to the printer 25 for printing is read from the RAM 13 or the flash memory 15 and is temporarily stored in the buffer 21.

The scanner 22 reads an image on an original inserted into the original insertion opening 6. The encoding unit 23 performs encoding of the original image read by the scanner 22. The decoding unit 24 reads received image data stored in the buffer 21 and decodes the image data. The decoded data is printed on the recording paper by the printer 25.

The printer 25 forms an image on a recording sheet, and includes: the EEPROM 31 disposed within the right-side supply side spool 66 (see FIG. 5) of the ink ribbon set 60S, a contact terminal unit 32 for electrically connecting the EEPROM 31 with the CPU 11, an LF motor driving circuit 34 for driving an LP motor 33 for conveying the ink ribbon 62, a rewinding motor driving circuit 36 for driving a rewinding motor 35 for rewinding the ink ribbon 62, and a ribbon out sensor 37 for detecting a situation where the ink ribbon of the ink ribbon cartridge 60 runs out. These construction elements are connected to the bus line 29 via an I/O port 38.

The EEPROM 31 is provided with a component identification memory 31*a*. The component-identification memory 31*a* stores the component-ID information of the ink ribbon set 60S. A serial number of the ink ribbon set 60S is used as the component-ID information in this embodiment. The component-ID information is read and used to judge whether or not the ink ribbon cartridge 60 is a standard product that includes a standard ink ribbon set 60S during the identification information reading processing to be described later (see FIG. 9). When it is judged that the ink ribbon cartridge 60 is not a standard product, a warning message is displayed on the LCD 4*a* of the operation panel 4. Note that the construction of the contact terminal unit 32 will be described in detail later.

An ink ribbon cartridge cover open/close sensor 26 is a sensor for detecting the open/close state of an ink ribbon cartridge cover, that is opened and closed at the time of replacement of the ink ribbon cartridge 60. As described above, the operation panel 4 is operated by an operator to perform various kinds of operations such as setting of the facsimile apparatus 1. The operation panel 4 is provided with the LCD 4*a* on which various kinds of messages are displayed. The amplifier 27 drives a speaker 28 connected to the amplifier 27, thereby outputting a ringing tone or the like. When the mounted ink ribbon cartridge 60 includes a non-standard ink ribbon set 60S and therefore is not a standard product, a warning message is displayed on the LCD 4*a* and a warning sound is outputted from the speaker 28. The facsimile apparatus 1 is connected to the telephone line 30 via the NCU 19.

The host apparatus 100 includes a CPU 101, a ROM 102, a RAM 103, a hard disk device (hereinafter referred to as the "HD") 104, an NCU 105, a modem 106, an interface 107, and an input/output port 108. Among these construction elements, the CPU 101, the ROM 102, the RAM 103, the interface 107, and the input/output port 108 are connected to each other through an address bus, a data bus, a control signal line, and the like.

The CPU 101 is a processing unit that operates based on a program stored in the ROM 102 and an operation system (OS) and various kinds of application programs stored in the HD 104, and performs various kinds of information processing. The ROM 102 is an unrewritable memory in which a control program and the like to be executed by this host apparatus 100 is stored. The RAM 103 is a rewritable memory in which various kinds of data are stored. The program in the HD 104 is loaded onto the RAM 103 as necessary and is executed by the CPU 101.

The input/output port 108 functions as an interface between the CPU 101 and the HD 104. The NCU 105 performs line control, and the host apparatus 100 is connected to the public telephone line 30 through this NCU 105 and receives a predetermined signal transmitted from the plurality of facsimile apparatuses 1 through the public telephone line 30. Also, when some facsimile apparatus requests the host apparatus 100 to set the facsimile apparatus in a permanent release mode or a temporary release mode to be described later through a remote operation, total information is produced based on apparatus-ID information and password information stored in an information memory 104*a* of the hard disk 104, and mode-specifying information, and is transmitted to the subject facsimile apparatus 1 that has issued the request. The modem 106 modulates and demodulates a signal to be exchanged and transmits the signal, and transmits/receives various kinds of procedure signals for transmission control.

The HD 104 is a rewritable large-capacity storage medium in which the operation system (OS) of the host apparatus 100 and various kinds of application programs are stored. The HD 104 is provided with the information memory 104*a*. The information memory 104*a* stores a plurality of sets of apparatus-ID information and password information for each of the plurality of facsimile apparatuses 1. One set of apparatus-ID information is set for each facsimile apparatus 1, and one set of password information is set for each apparatus-ID information. The password information functions as one parameter for setting the permanent release mode or the temporary release mode. The related information is confidential to the user. It is noted that the password information for each facsimile apparatus 1 is the same as that stored in the ROM 12 of the subject facsimile apparatus 1.

The information memory 104*a* further stores the number of times of setting the temporary release mode that is equal to that stored in the temporary release mode setting number counter 13*b* in each facsimile apparatus 1.

Figure 3:
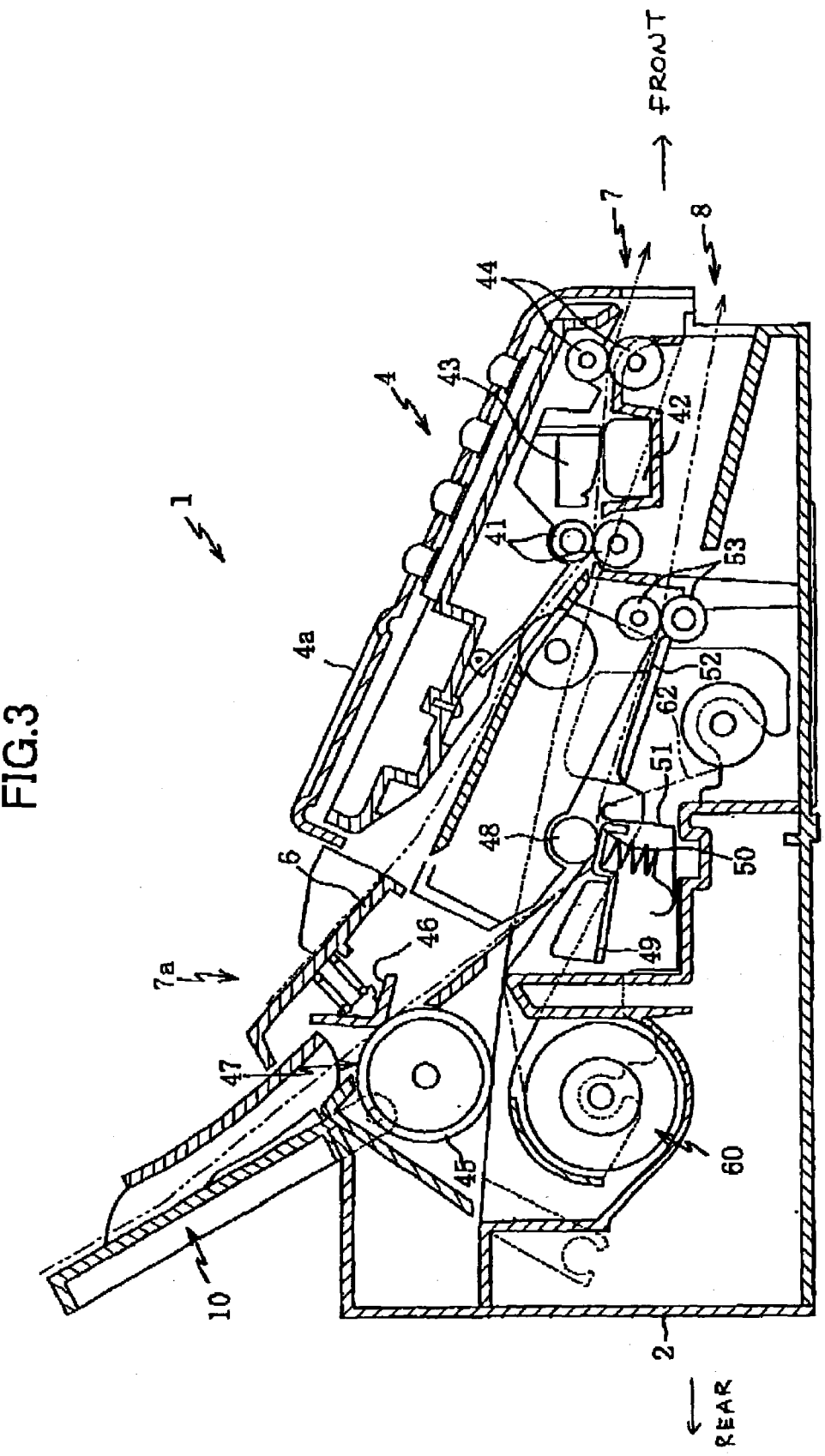
FIG. 3 is a side cross-sectional view of the facsimile apparatus.

Next, the internal construction of the facsimile apparatus 1 will be described with reference to FIG. 3. FIG. 3 is a side cross-sectional view of the facsimile apparatus 1. In the main body case 2, below the operation panel 4, there are disposed a pair of feed rollers 41 for transporting an original from the original insertion opening 6, a contact-type image scanner portion (CIS) 42, an original pressing member 43 disposed on the upper side of a reading portion of the CIS 42, and a pair of sheet discharging rollers 44. On one side of the sheet discharging roller pair 44, there is disposed the original discharging opening 7. In the main body case 2, below the recording paper holder 10, there is provided a sheet feeding portion 47 composed of a feed roller 45 for feeding the recording paper one sheet at a time from the recording paper holder 10 and a separation pad 46 that is urged by a spring against the outer peripheral surface of the feed roller 45.

Below the sheet feeding portion 47, there are disposed a roller-shaped platen 48 functioning as a recording portion, a thermal head 50 provided on a printing stand 49 that is urged by a spring toward the undersurface of the platen 48, and the ink ribbon cartridge 60 that is detachably mounted in the facsimile apparatus 1 and that is provided over the printing stand 49.

The ink ribbon cartridge 60 is disposed in a forwardly declined manner (hip-up manner) so that the supply side of the ink ribbon 62 is disposed on the rear side of the main body case 2, the take-up side thereof is disposed on the front side of the main body case 2, and the supply side is positioned higher than the take-up side. The ink ribbon 62 wound and stretched between the supply side and the take-up side passes over top surfaces of the thermal head 50 and of a tension member 51 (plate spring), and reaches the lower peripheral surface side on the take-up side. The ink surface of the ink ribbon 62 faces up. Recording paper placed on the upper surface (ink surface) of the ink ribbon 62 is subjected to printing in a printing portion at which the platen 48 abuts against the thermal head 50. The recording paper then passes over the upper surface of a partition board 52 (FIG. 4), which is formed in an upper portion on the take-up side of the ink ribbon cartridge 60 and which has a convey shoot function. The recording paper is finally discharged from the recording sheet discharging opening 8 by a pair of sheet discharging rollers 53.

Figure 4:
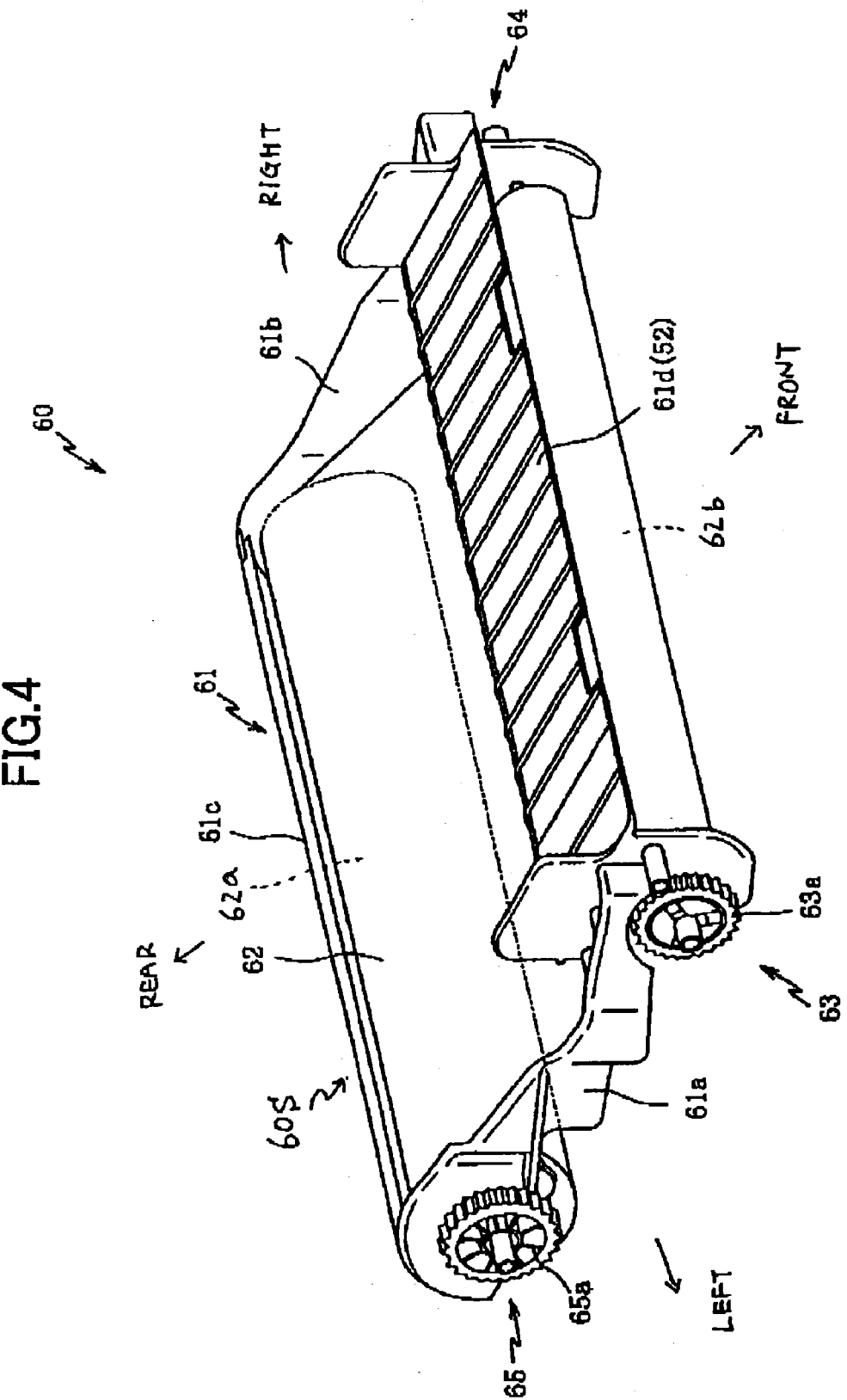
FIG. 4 is a perspective view of an ink ribbon cartridge.
Figure 5:
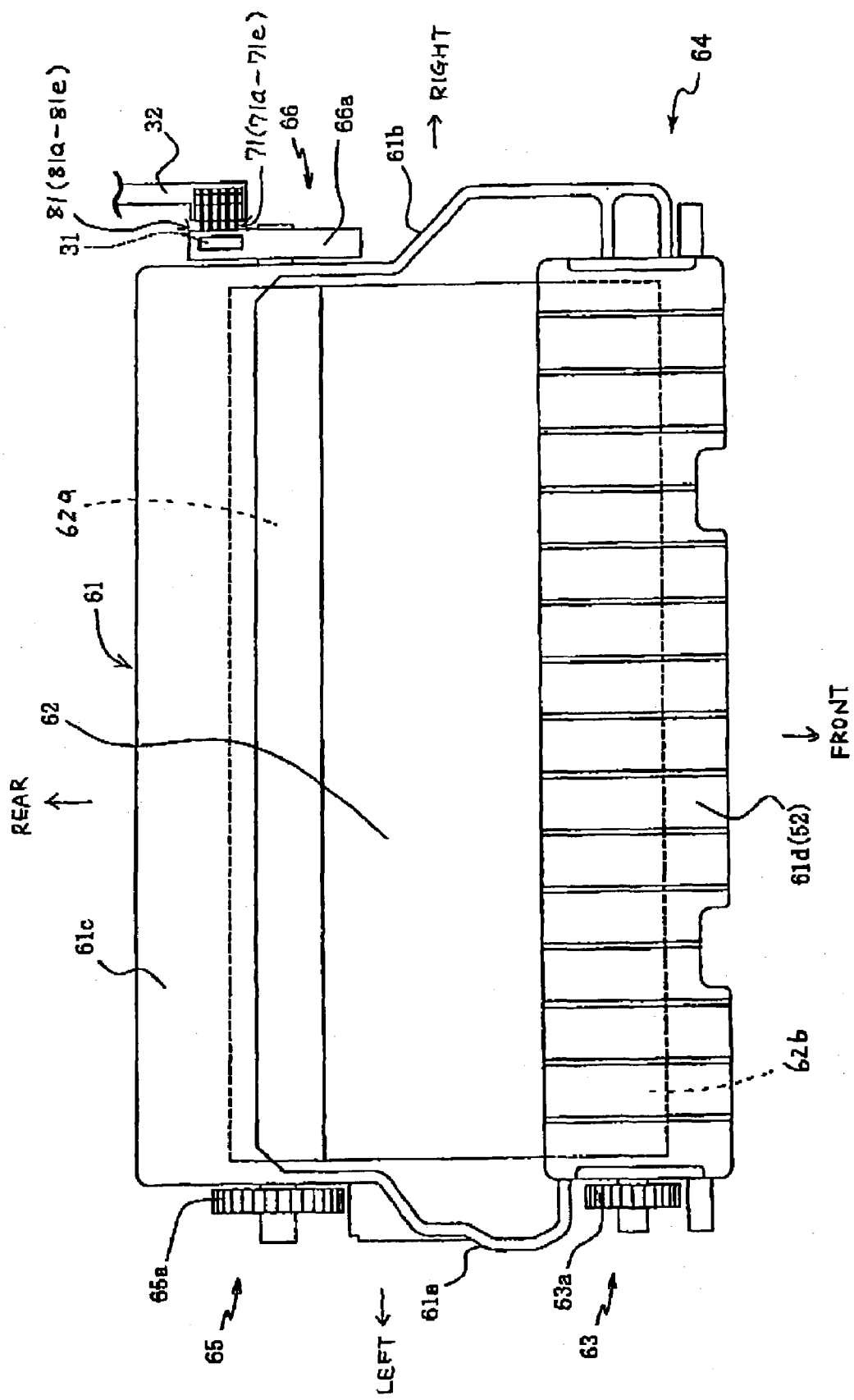
FIG. 5 is a top view of the ink ribbon cartridge.

Next, the ink ribbon cartridge 60 will be described with reference to FIGS. 4 and 5. It is noted that FIG. 5 shows the contact terminal unit 32 attached to the main body 2 of the facsimile apparatus 1 together with the ink ribbon cartridge 60, thereby schematically showing how the contact terminal unit 32 connects the right-side supply side spool 66.

An ink ribbon set 60S is composed of the ink ribbon 62, a supply-side roll core 62a, a take-up side roll core 62b, a left-side take-up side spool 63, a right-side take-up side spool 64, the left-side supply side spool 65, and right-side supply side spool 66.

The ink ribbon 62 is a resin film provided with an ink layer on the whole part of one surface (upper side surface in FIG. 5) thereof. The ink ribbon 62 is wound and stretched between the supply-side roll core 62a and the take-up side roll core 62b in a manner that a not-yet used part of the ink ribbon 62 is wound around the supply-side roll core 62a and an used part of the ink ribbon 62 is wound around the take-up side roll core 62b. The supply-side roll core 62a and the take-up side roll core 62b are made of paper.

The supply side spools 65 and 66 are for axially supporting the supply-side roll core 62a. The supply side spools 65 and 66 are fitted into the internal hollow portions at both the right and left ends of the supply-side roll core 62a. The take-up side spools 63 and 64 are for axially supporting the take-up side roll core 62b. The take-up side spools 63 and 64 are fitted into the internal hollow portions at both the right and left ends of the take-up side roll core 62b.

Coupling gears 63a and 65a are integrally formed on the outer peripheral surfaces of the left-side take-up side spool 63 and the left-side supply side spool 65. The coupling gears 63a and 65a have a spur gear shape and are made of a resin or the like.

The ink ribbon cartridge 60 is constituted as a cartridge. This construction makes it easy to replace, with another one, the ink ribbon cartridge 60 mounted to the facsimile apparatus 1. The ink ribbon cartridge 60 includes a cartridge main body 61 that receives the ink ribbon set 60S. Note that the ink ribbon cartridge 60 contains the ink ribbon set 60S so that this ink ribbon set 60S is detachably attached to the cartridge main body 61. That is, the spools 63 to 66 supporting the ink ribbon 62 are rotatably and detachably supported on the cartridge main body 61. As a result, when it is desired to replace the ink ribbon 62 with a new one, it is possible for the user not only to perform the replacement by purchasing the whole of a new ink ribbon cartridge 60 but also to perform the replacement by purchasing only a new ink ribbon set 60S and by reusing the cartridge main body 61.

The cartridge main body 61 is a member functioning as a frame of the ink ribbon cartridge 60 and is integrally formed by injection molding using a synthetic resin material. As shown in FIG. 5, this cartridge main body 61 is formed in an approximately rectangular shape when viewed from its top surface. Also, the cartridge main body 61 is composed of a pair of right and left side boards 61a and 61b, an upper (rear) cover piece 61c, and a lower (front) cover piece 61d. The right and left side boards 61a and 61b are provided so as to extend from the ink ribbon supply side (upper side in FIG. 5) to the ink ribbon take-up side (lower side in FIG. 5) so that both of the right and left sides of the ink ribbon 62 is surrounded. The upper cover piece 61c couples the right and left side boards 61a and 61b at the ink ribbon supply sides. The lower cover piece 61d couples the right and left side boards 61a and 61b at the ink ribbon take-up sides. The lower cover piece 61d functions as the partition board 52 (FIG. 3) as well.

The pair of roll cores 62a and 62b are rotatably supported by the side boards 61a and 61b of the cartridge main body 61 via the take-up side spools 63 and 64 and the supply side spools 65 and 66. In order to form an image on the recording paper, the ink layer side of the ink ribbon 62 is positioned to oppose the recording paper, the ink ribbon 62 and the recording paper are nipped between the platen 48 and the thermal head 50, and a heating element of the thermal head 50 is energized in accordance with image data, thereby forming an image on the recording paper one line at a time.

When the ink ribbon cartridge 60 is mounted to the main body 2 (see FIG. 1) of the facsimile apparatus 1, the coupling gear 63a of the left-side take-up side spool 63 engages with another coupling gear (not shown), which is coupled to a pinion gear attached to a rotation shaft of the LF motor 33 (see FIG. 2). Similarly, the coupling gear 65a of the left-side supply side spool 65 is coupled via still another coupling gear (not shown) to another pinion gear attached to a rotation shaft of the rewinding motor 35 (see FIG. 2).

Accordingly, when the rotation shaft of the LF motor 33 makes rotation, the rotation is transmitted to the coupling gear 63a through the pinion gear and the coupling gear (not shown), so that the coupling gear 63a is rotated. The rotation of the coupling gear 63a is transmitted to the take-up side roll core 62b through the left-side take-up side spool 63, so that the take-up side roll core 62b is rotated together with the take-up side spools 63 and 64. As a result, a not-yet printed part of the ink ribbon 62 is taken up to the take-up side from the supply side, with the supply-side roll core 62a and the supply side spools 65 and 66 rotating following the rotation of the take-up side members.

During the identification information reading processing (see FIG. 9) to be described later, when the right-side supply side spool 66 (on the right side in FIG. 5) exists at a rotational position at which the contact terminal unit 32 is unable to read data from the EEPROM 31, the LF motor 33 is driven to rotate the left-side take-up side spool 63 in the take-up direction, as a result of which the right-side supply side spool 66 rotates following the rotation of the left-side take-up side spool 63 to reach another rotational position at which the contact terminal unit 32 can read data from the EEPROM 31. This, however, results in a situation where the ink ribbon 62 that is not yet used is wastefully conveyed. In view of this potential problem, the ink ribbon 62 is rewound by the rewinding motor 35 to be described later by a length of the ink ribbon 62 that has been conveyed by the LF motor 33. As a result, unnecessary consumption of the ink ribbon 62 can be saved.

When the rotation shaft of the rewinding motor 35 makes rotation, the rotation is transmitted to the coupling gear 65a through the pinion gear and another coupling gear (not shown), so that the coupling gear 65a is rotated. The rotation of the coupling gear 65a is transmitted to the supply-side roll core 62a through the left-side supply side spool 65, so that the supply-side roll core 62a is rotated together with the supply-side spools 65 and 66. This rotation is made in a reverse direction with respect to the rotation direction when the LF motor 33 has rotated to take up a new part of the ink ribbon 62 to the take-up side. As a result, it is possible to rewind, to the supply side, the ink ribbon 62 that has been conveyed to the take-up side.

A flange 66a is provided on the right-side supply side spool 66 and is in a circular plate shape whose center is located on the central rotation axis of the right-side supply side spool 66. The EEPROM 31 (see FIG. 2) is provided in the interior of the flange 66a. An electrode pattern 81 (reading terminals 81a to 81e) electrically connected from the EEPROM 31 is exposed on a right-side axial-direction end surface (on the right side in FIG. 5) of the flange 66a as shown in FIG. 7(*a*). As shown in FIG. 5, when the ink ribbon cartridge 60 is mounted to the main body 2 (see FIG. 1) of the facsimile apparatus 1, the contact terminals 71 (71*a* to 71*e*) on the contact terminal unit 32, provided to the main body 2, contact the electrode pattern 81 (81*a* to 81*e*) of the flange 66a. As a result, the EEPROM 31 and the CPU 11 are electrically connected to each other, and it becomes possible to read the component-ID information stored in the component-identification memory 31*a* of the EEPROM 31.

Figure 6A:
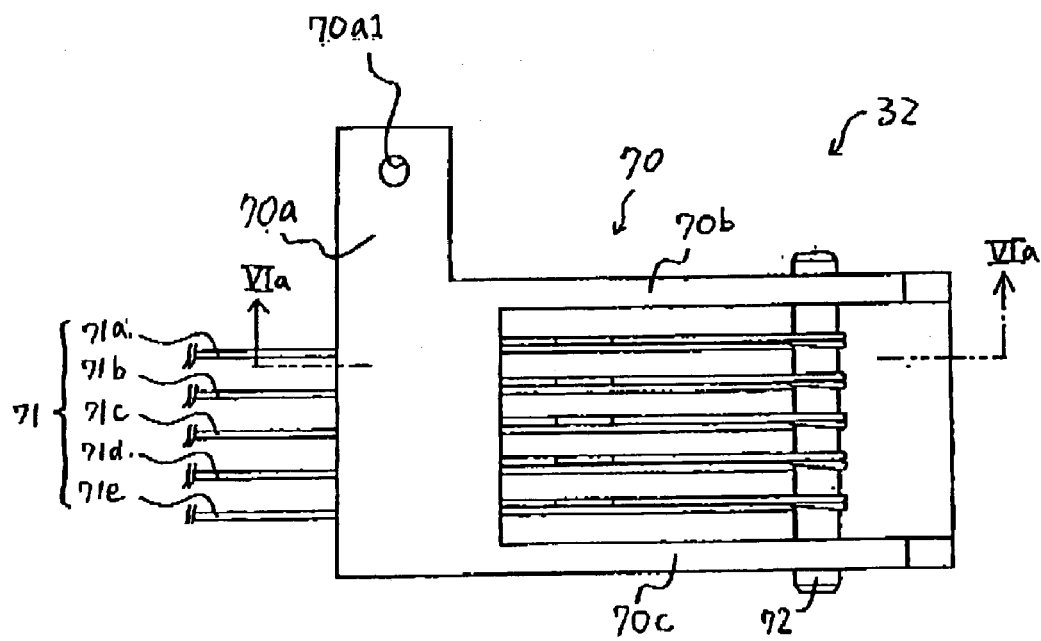
FIG. 6(a) is a left side view of a contact terminal unit and viewed from the left side thereof in FIG. 5.
Figure 6B:
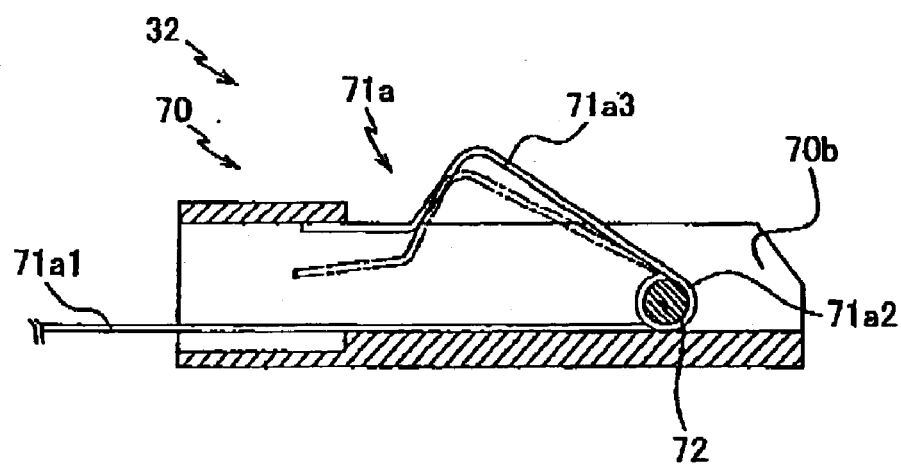
FIG. 6(b) is a side cross-sectional view of the contact terminal unit taken along a line VIa—VIa in FIG. 6(a)

Next, the constructions of the contact terminal unit 32 and the right-side supply side spool 66 will be described in detail with reference to FIGS. 6(*a*), 6(*b*), 7(*a*), and 7(*b*). FIG. 6(*a*) is a left side view of the contact terminal unit 32 as viewed from the left side of the contact terminal unit 32 in FIG. 5, while FIG. 6(*b*) is a side cross-sectional view of the contact terminal unit 32 taken along the VIa—VIa line in FIG. 6(*a*). Also, FIG. 7(*a*) is a right side view of the right-side supply side spool 66 as viewed from the right side of the right-side supply side spool 66 in FIG. 5, while FIG. 7(*b*) is a side cross-sectional view of the right-side supply side spool 66 taken along the VIIa—VIIa line in FIG. 7(*a*). Note that in FIGS. 6(*a*), 6(*b*), 7(*a*) and 7(*b*), some portions of a contact terminal 71 and the right-side supply side spool 66 are omitted.

The contact terminal unit 32 is for electrically connecting the CPU 11 to the EEPROM 31 contained in the flange 66a using the contact terminals 71. The contact terminal unit 32 is mainly composed of a holder member 70, the contact terminals 71, and a shaft member 72. The holder member 70 is an approximately box-shaped member whose surface on the left side (frontward side on the paper plane of FIG. 6(*a*)) is opened, as shown in FIGS. 6(*a*) and 6(*b*). The holder member 70 functions as a frame of the contact terminal unit 32 and is formed using a resin material or the like. An attachment portion 70a extends from one side of the holder member 70 and a screw fastening hole 70a1 is formed in the attachment portion 70a. The holder member 70 is fixed to the main body 2 of the facsimile apparatus 1 by a screw inserted into the screw fastening hole 70a1.

Also, the shaft member 72 formed in an approximately cylindrical shape is disposed between a pair of side walls 70b and 70c of the holder member 70 that oppose each other. Five contact terminals 71*a* to 71*e* are wound around and rotatably attached to the shaft member 72. The contact terminals 71*a* to 71*e* are evenly spaced in the axial direction of the shaft member 72 (top-bottom direction in FIG. 6(*a*)).

Each of the contact terminals 71*a* to 71*e* is formed in a thin line shape using a conductive material that is capable of being resiliently deformed. The contact terminal 71*a* includes a base portion 71*a*1, a wound portion 71*a*2, and a terminal portion 71*a*3, as shown in FIG. 6(*b*). One end (right side in FIG. 6(*b*)) of the base portion 71*a*1 is connected to the CPU 11 (see FIG. 2). The terminal portion 71*a*3 contacts the corresponding reading electrode 81*a* provided on the right-side axial-direction end surface of the right-side supply side spool 66 (flange 66a) The terminal portion 71*a*3 is formed so as to be bent in an approximately S-letter shape and to protrude from the opened portion (on the upper side in FIG. 6(*b*)) of the holder member 70, as shown in FIG. 6(*b*). The base portion 71*a*1 and the terminal portion 71*a*3 are coupled to each other through the wound portion 71*a*2 wound around the shaft member 72 once, which constitutes a twisted spring that urges the base portion 71*a*1 and the terminal portion 71*a*2 in a direction in which a space therebetween is increased.

When the contact terminal 71*a* is brought into contact with the right-side axial-direction end surface of the flange 66a of the right-side supply side spool 66 (see FIG. 5), the contact terminal 71*a* is resiliently compressed and deformed as indicated by the virtual line in FIG. 6(*b*) (that is, a state where the contact terminal 71*a* is deformed so that the space between the base portion 71*a*1 and the terminal portion 71*a*2 is reduced). With this construction, the contact terminal 71*a* is brought into press-contact with the reading terminal 81*a* of the electrode pattern 81 (FIG. 7(*a*)) and therefore it becomes possible to maintain a proper contact state therebetween. As a result, it becomes possible to prevent poor connection between the CPU 11 and the EEPROM 31 and to improve reliability. Note that other contact terminals 71*b* to 71*e* are constructed in the same manner as the contact terminal 71*a* described above and for contacting with the reading terminals 81*b* to 81*e*, respectively.

With the construction described above, even when the contact terminals 71*a* to 71*e* are pushed away from the reading terminals 81*a* to 81*e* due to a careless operation at the time of replacement of the ink ribbon set 60S, or when spaces between the reading terminals 81*a* to 81*e* and the contact terminals 71*a* to 71*e* become improper due to manufacturing fluctuation tolerances, for instance, the contact terminals 71*a* to 71*e* are capable of being resiliently deformed toward the reading terminals 81*a* to 81*e* side by utilizing their resilient restoration force, so that it becomes possible to establish contact with the reading terminals 81*a* to 81*e* with reliability and to maintain the contact state.

Contrary to the case where barcode information is read using an optical sensor of a light reflection type, for instance, it becomes possible to avoid erroneous detection due to pollution by a scattered material, which makes it possible to improve reliability by obtaining the information with reliability.

Now referring to FIG. 7(*a*), the electrode pattern 81 is formed to be exposed to the right-side axial-direction end surface (frontward side on the paper plane of FIG. 7(*a*)) of the flange 66a. The electrode pattern 81 is for contacting the contact terminals 71*a* to 71*e* of the contact terminal unit 32 and electrically connecting the CPU 11 to the EEPROM 31. The electrode pattern 81 is provided only in a semicircular area having a central angle of about 180° on the right-side axial-direction end surface of the flange 66a, so that the material cost of the electrode pattern 81 is reduced, which saves the material cost of the ink ribbon cartridge 60 or the whole of the facsimile apparatus 1 accordingly. The electrode pattern 81 includes the five reading terminals 81*a* to 81*e* formed in an arc shape. These reading terminals 81*a* to 81*e* are evenly spaced so that the reading terminals 81*a* to 81*e* are respectively capable of contacting the contact terminals 71*a* to 71*e* described above. Also, the reading terminals 81*a* to 81*e* are formed in an approximately concentric arc shape with respect to the central, rotational axis of the flange 66a, so that it is possible to maintain their contact state with the contact terminals 71*a* to 71*e* even during rotation of the right-side supply side spool 66 (flange 66a).

Accordingly, when the flange 66a of the right-side supply side spool 66 is rotated in an ink ribbon supply direction (or ink ribbon rewinding direction) through driving by the LF motor 33 (or rewinding motor 35), the contact terminals 71*a* to 71*e* of the contact terminal unit 32 slide on the right-side axial-direction end surface of the flange 66a. The contact terminals 71*a* to 71*e* respectively contact the reading terminals 81*a* to 81*e* only while the contact terminals 71*a* to 71*e* are sliding on the right-side axial-direction end surface of the flange 66a by approximately 180° from a predetermined rotational position. During this operation, the EEPROM 31 and the CPU 11 are electrically connected to each other and therefore it is possible to read the component-ID information from the EEPROM 31. On the other hand, while the contact terminals 71a to 71e are sliding on the right-side axial-direction end surface of the flange 66a by the remaining angle of 180°, the contact terminals 71a to 71e do not contact the reading terminals 81a to 81e and electrical connection between the EEPROM 31 and the CPU 11 is not established. As a result, it is impossible to read the component-ID information from the EEPROM 31 during this operation.

As shown in FIG. 7(b), the right-side supply side spool 66 is mainly composed of the flange 66a and a support shaft portion 66b. The support shaft portion 66b is fitted into the internal hollow portion of the supply-side roll core 62a around which a not-yet used part of the ink ribbon 62 is wound. The flange 66a has a disc portion 66a1 formed integrally with the support shaft portion 66b, and a cover member portion 66a2 covering an opened surface side (right side in FIG. 7(b)) of the disc portion 66a1. The EEPROM 31 is contained in an internal space between the opposing surfaces of the cover member portion 66a2 and the disc portion 66a1. The reading terminals 81a to 81e are formed on the outer surface of the cover portion 66a2 and extend into the internal space by passing through the wall of the cover member portion 66a2, and are connected to the EEPROM 31, as indicated by the dotted lines in FIG. 7(b). In this way, the reading terminals 81 are exposed on the right-side axial-direction end surface of the right-side supply side spool 66. Note that as shown in FIGS. 7(a) and 7(b), the reading terminals 81d and 81e are connected with each other and are connected to a common terminal of the EEPROM 31.

Here, the reading terminals 81a to 81e of the electrode pattern 81 constitute various lines for the EEPROM 31. That is, the reading terminal 81a constitutes a clock supply line for read/write, the reading terminal 81b constitutes a read/write signal line, the reading terminal 81c constitutes a power supply line, the reading terminal 81d constitutes a ground line, and the reading terminal 81e constitutes an electrical connection detection line.

Accordingly, the contact terminal 71a contacting the reading terminal 81a (clock supply line) is connected to the clock terminal of the CPU 11 and the contact terminal 71b contacting the reading terminal 81b (read/write signal line) is connected to the read/write terminal of the CPU 11. Also, the contact terminal 71c contacting the reading terminal 81c (power supply line) is connected to the power terminal of the CPU 11 and the contact terminal 71d contacting the reading terminal 81d (ground line) is connected to the ground terminal of the CPU 11.

Also, the contact terminal 71e contacting the reading terminal 81e (electrical connection detection line) is connected to the C terminal of the CPU 11, and a predetermined voltage (5 V, for instance) is applied to their connection path through a high resistance of several tens kΩ. As a result, when the contact terminal 71e is not in contact with the reading terminal 81e (electrical connection line), a high-level (5 V) signal is inputted into the C terminal of the CPU 11 by the voltage applied to the connection path. On the other hand, when the contact terminal 71e is in contact with the reading terminal 81e (electrical connection line), the contact terminal 71e is connected to the contact terminal 71d (the ground line) and the input into the C terminal of the CPU 11 is changed to a low-level (0 V) signal, because the reading terminal 81d is connected with the reading terminal 81e (see FIG. 7(b)). Based on the input level of the C terminal, the CPU 11 can recognize whether or not the reading terminals 81a to 81e contact the contact terminals 71a to 71e, that is, whether or not the right-side supply side spool 66 exists at a position at which it is possible to read the component-ID information from the EEPROM 31.

It is noted that many ink ribbon set 60S, which are mounted with standard ink ribbons 62 and which are mountable in the cartridge main body 61, are manufactured by a manufacturer of the facsimile apparatus 1 and by manufacturers of ink ribbons. The standard ink ribbons 62 are determined and confirmed by the facsimile-manufacturer as such ink ribbons whose characteristics, such as durability and quality, satisfy a predetermined standard required to attain a satisfactory print operation. Many other ink ribbon set 60S, which are mounted with non-standard ink ribbons 62 but which are mountable in the cartridge main body 61, are manufactured by other ribbon-manufacturers. The non-standard ink ribbons 62 are not confirmed by the facsimile-manufacturer, and therefore it is unknown whether the characteristics of the non-standard ink ribbons 62 satisfy the predetermined standard. The characteristics of the non-standard ink ribbons may possibly fail to satisfy the predetermined standard. When the non-standard ink ribbons are mounted in the facsimile apparatus 1, therefore, the facsimile apparatus 1 may possibly fail to attain the satisfactory printing operation.

Figure 10:
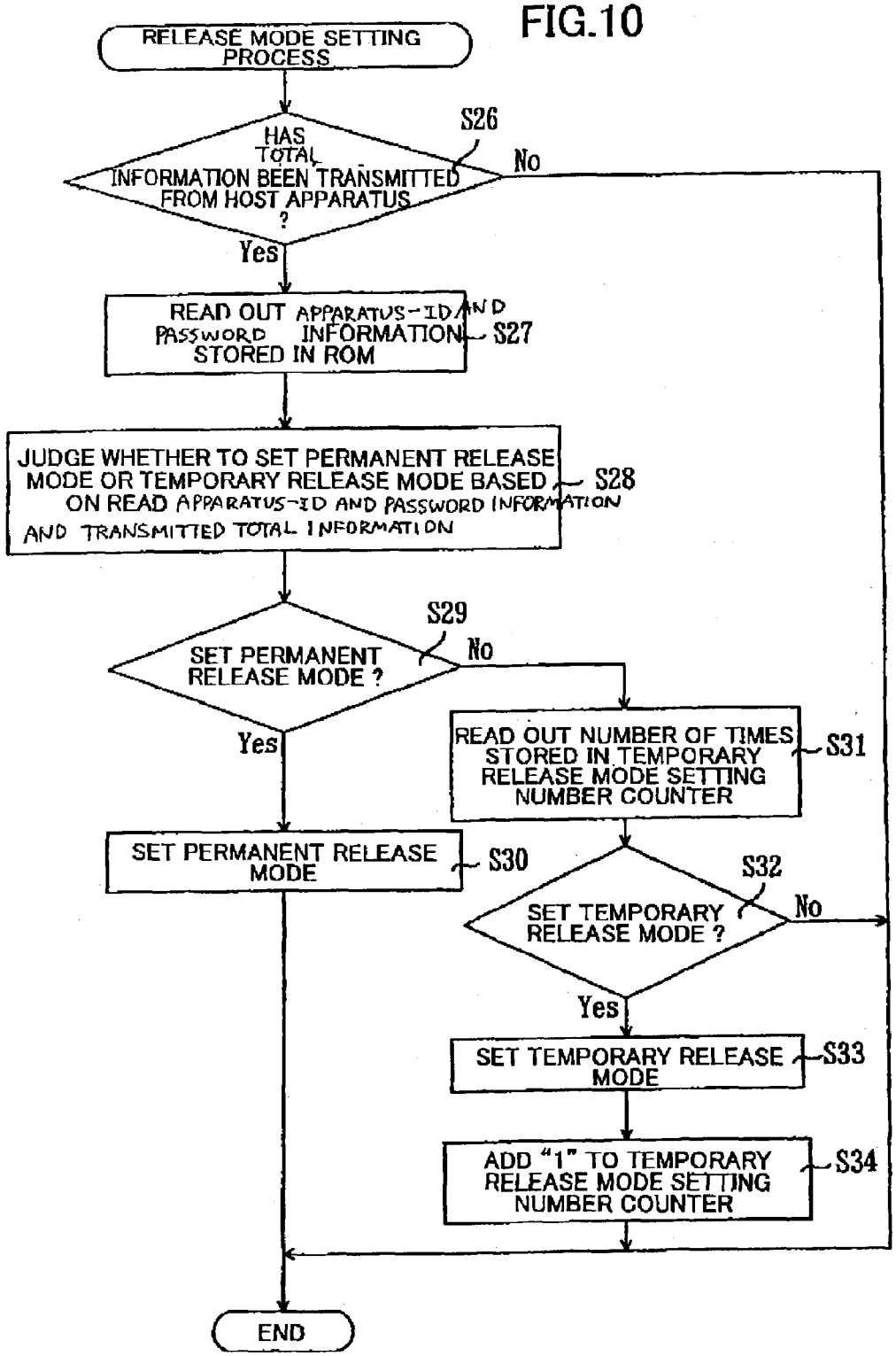
FIG. 10 is a flowchart showing a release mode setting process.

Next, the operation of the facsimile apparatus 1 will be described with reference to the flowcharts in FIGS. 8 to 10. The CPU 11 executes a series of operations in the flowcharts periodically while the facsimile apparatus 1 is powered on.

First, the CPU 11 judges whether or not the present processing is a first processing after the facsimile apparatus 1 is turned on (hereinafter referred to as "first processing after power-on") (Step 1). Step will be hereinafter abbreviated as "S". If the facsimile apparatus 1 is not at "first processing after power-on" (S1: No) the CPU 11 judges whether or not the ribbon cassette cover is opened (S2). If the facsimile apparatus 1 is at "first processing after power-on" (S1: Yes), there is a possibility that the ink ribbon cartridge 60 has been replaced during power-off. Also, if the ribbon cassette cover is opened (S2: Yes) although the facsimile apparatus 1 is not at "first processing after power-on" (S1: No), there is a possibility that the ink ribbon cartridge 60 is currently being replaced. When the ink ribbon cartridge 60 that is not a standard product is mounted as a result of the replacement, there is a fear of not only degradation of printing quality but also breakage of the thermal head 50. Therefore, in such a case (S1: Yes or S2: Yes), the identification information reading processing (S24) will be executed unless a temporary or permanent release mode is being set, thereby judging whether or not the mounted ink ribbon cartridge 60 is a standard product.

On the other hand, if the facsimile apparatus is not at "first processing after power-on" (S1: No) and the ribbon cassette cover is not opened (S2: No), this means that the ink ribbon cartridge 60 is not currently being replaced, and it has already been judged at the already-executed processing of FIG. 8 whether or not the currently mounted ink ribbon cartridge 60 is a standard product. Thus, it is not required to judge whether or not the ink ribbon cartridge 60 is a standard product any more, so that this identification information reading processing is ended.

In S3, it is judged whether or not the ribbon cassette cover is closed (S3) and if the ribbon cassette cover is not closed (S3: No), the CPU 11 waits for the ribbon cassette cover to be closed. Then, after it is confirmed that the ribbon cassette cover is closed (S3: Yes), the CPU 11 judges whether or not the facsimile apparatus 1 is currently set in the permanent release mode (S20) or in the temporary release mode (S21).

When the facsimile apparatus 1 is set in the permanent release mode (S20: Yes), the identification information reading processing (S24) is skipped and the present processing is ended.

On the other hand, if the facsimile apparatus 1 is set in the temporary release mode (S21: Yes), the CPU 11 judges in S22 whether or not the ink ribbon cartridge 60 has been replaced. If the ink ribbon cartridge 60 has not been replaced (S22: No), a message indicating that the ink ribbon cartridge has some problem is displayed on the LCD 4*a* (S25), thereby requesting the user to replace the ink ribbon cartridge. In this case, the user can start an ordinary printing operation by skipping the identification information reading processing (S24).

Alternatively, the user can replace the ink ribbon cartridge (S22: Yes), releasing the temporary release mode (S23), and having the identification information reading processing (S24) executed in a usual manner. As a result, it is possible to judge whether or not the mounted ink ribbon cartridge is a standard product prior to printing, which makes it possible to prevent a situation where a non-standard ink ribbon cartridge is used and printing quality is possibly degraded. Note that a process for setting this temporary release mode will be described later with reference to the flowchart in FIG. 10. Also, when neither the permanent release mode (S20: No) nor the temporary release mode (S21: No) is set, the CPU 11 executes the identification information reading processing (S24).

Here, the permanent release mode is a mode for permanently prohibiting the identification information reading processing (S24) to be described later. As described above, it is originally preferable that the CPU 11 judges whether or not the mounted ink ribbon cartridge 60 is a standard product prior to an ordinary printing operation to prevent a situation where printing quality is degraded or the thermal head 50 is broken due to the mounting and usage of a non-standard product.

However, some trouble occurs in the facsimile apparatus 1 such that the contact terminals 71 are lost or the electric circuits connected to the contact terminals 71 are short-circuited in the facsimile apparatus 1, for instance. In this case, it becomes impossible to read the component-ID information of the ink ribbon cartridge 60. Therefore, even if the mounted ink ribbon cartridge 60 is a standard product, a message indicating that the ink ribbon cartridge is not a standard product and that printing quality is not guaranteed will be permanently issued to the user in the identification information reading processing (S24), which is an inconvenient situation for the user. In view of this problem, if a trouble occurs in the apparatus side, the permanent release mode is set (S20: Yes), and the identification information reading processing (S24) is skipped. Thus, such a message or the like is not issued, and the user can start a printing operation under a stress-free condition. Also, the user is not required to perform repair, replacement, or the like of the defective portion to avoid such an inconvenient situation, so that it becomes possible to reduce an economical burden on the user. Note that a process for setting this permanent release mode will be described in detail later with reference to FIG. 10.

On the other hand, the temporary release mode is a mode for temporarily prohibiting the identification information reading processing (S24). As described above, it is preferable that the identification information reading processing (S24) is executed. However, there is a case where any of the reading terminals 81*a* to 81*e* formed on the right-side axial-direction end surface of the flange 66*a* is lost or the electric circuits connected to the reading terminals 81*a* to 81*e* are short-circuited, for instance. That is, although no trouble occurs on the facsimile apparatus 1 side, if some trouble has occurred in the ink ribbon cartridge 60, it becomes impossible to read the component-ID information.

If the identification information reading processing were permanently prohibited in such a case, the identification information reading processing will not be executed even if a non-standard ink ribbon cartridge 60 is mounted afterward, so that there will occur a problem that the user can not obtain desired printing quality and, in the worse case, a trouble may occur in the facsimile apparatus 1.

Accordingly, unlike the case where some trouble has occurred in the facsimile apparatus 1, when some trouble has occurred to the ink ribbon cartridge 60, the temporary release mode is set to normally execute the identification information reading processing (S24) when the defective cartridge is replaced with another ink ribbon cartridge.

Next, the identification information reading processing (S24) will be described in detail with reference to FIG. 9. In this identification information reading processing, first, the value of the rotation counter 13*a* in the RAM 13 is cleared to "0" (S4). Then, the processing proceeds to S5.

In S5, the CPU 11 judges whether or not the input into the C terminal of the CPU 11 is at the low level (0 V). That is, the CPU 11 judges whether or not the flange 66*a* of the right-side supply side spool 66 is located at such a rotational position where the contact terminal unit 32 can read the component-ID information from the EEPROM 31 (hereinafter referred to as "readable position"), that is, whether or not the electrode pattern 81 contacts the contact terminals 71*a* to 71*e*, and the EEPROM 31 and the CPU 11 are electrically connected to each other (S5).

If the CPU 11 has found that the flange 66*a* is positioned where it is impossible to read the component-ID information stored in the EEPROM 31 (hereinafter referred to as "non-readable position"), that is, the electrode pattern 81 of the flange 66*a* is not contacting the contact terminals 71*a* to 71*e* (S5: No), then the flange 66*a* of the right-side supply side spool 66 is rotated by approximately 90° to bring the electrode pattern 81 into contact with the contact terminals 71*a* to 71*e* (S8).

On the other hand, if the CPU 11 has found that the flange 66*a* is positioned where it is possible to read the component-ID information stored in the EEPROM 31 (S5: Yes), then the component-ID information is read from the EEPROM 31 (S6) and the CPU 11 judges whether or not the mounted ink ribbon cartridge 60 is a standard product (S7) by judging whether or not the read component-ID information matches any of the reference data prestored in the ROM 12.

If the CPU 11 has determined that the ink ribbon cartridge 60 is not a standard product (S7: No), the process proceeds to S8, in which the flange 66*a* is rotated by approximately 90° (S8). That is, the take-up side spools 63 and 64 are rotated in a take-up direction to take up the ink ribbon 62 from the supply side. This is because the read component-ID information may possibly fail to match the reference data although the ink ribbon cartridge 60 is a standard product because a read error has occurred by poor contact (due to a dust or corrosion of a contact point, for instance) between the reading terminal 81*b* constituting the read/write signal line and the contact terminal 71*b*, for instance. Therefore, in this case, the contact terminals 71*a* to 71*e* are made to slide on the electrode pattern 81 by rotating the flange 66*a*, which makes it possible to solve the poor contact by removing the dust or changing the contact point. As a result, it becomes possible to normally read the component-ID information, which eliminates inconveniences of the user by avoiding erroneous judgment.

After the flange 66*a* of the right-side supply side spool 66 is rotated by about 90° (S8), a value "1" is added to the value of the rotation counter 13*a* (S9) and the CPU 11 judges whether or not the ink ribbon 62 has been consumed to its trailing end (S10). That is, since the unused ink ribbon 62 on the supply side is conveyed to the take-up side as a result of the rotation of the flange 66*a* in S8, the CPU 11 judges whether or not the ink ribbon 62 has been consumed to its trailing end based on a detection result by the ribbon out sensor 37 (see FIG. 2). If the ink ribbon 62 has been consumed to its trailing end (S10: Yes), it is impossible to perform printing, so that a message indicating that the ink ribbon 62 has been consumed to its trailing end is displayed on the LCD 4*a* (S11) and the identification information reading processing is ended.

In S10, if the ink ribbon 62 has not reached its trailing end (S10: No), the CPU 11 judges whether or not the value of the rotation counter 13*a* is equal to or more than "9", (S12). If the CPU 11 finds that the value of the rotation counter 13*a* has not yet reached "9" (S12: No), the processing returns to S5. Following this, steps S5 to S12 are repeated until the flange 66*a* is rotated to a position at which it is possible to read the component-ID information of the EEPROM 31 or until the poor contact due to a dust or the like is solved and it becomes possible to normally read the component-ID information of the EEPROM 31.

It is noted that the electrode pattern 81 is formed in is a semicircular shape having a central angle of about 180° (see FIG. 7). The flange 66*a* having the electrode pattern 81 is rotated by about 90° at a time (S8). Therefore if the CPU 11 finds in S12 that the value of the rotation counter 13*a* is equal to or more than "9" (S12: Yes), that indicates the flange 66*a* has made at least two times of full rotation (720°). It can therefore be considered that the flange 66*a* has been rotated to the readable position because the contact terminals 71*a* to 71*e* have already slid on the electrode pattern 81 at least four times. It cannot be considered that the component-ID information does not match the reference data due to a read error resulting from a dust or the like.

Accordingly, in this case (S12: Yes), the CPU 11 determines that the mounted ink ribbon cartridge 60 is not a standard product but includes a non-standard ribbon set 60S and a message informing that the ink ribbon cartridge 60 is not a standard product and therefore printing quality is not guaranteed is displayed on the LCD 4*a* (S13). After the message is issued to the user, the present identification information reading processing is ended. Note that the warning message displayed on the LCD 4*a* has variations such that a message merely indicating that the ink ribbon cartridge 60 is not a standard product or a message indicating that there is a danger that the thermal head 50 is may be damaged. In this case, even if the user receives the warning message from the facsimile apparatus 1, the user may continue using the currently mounted ink ribbon cartridge 60 by disregarding the message. On the other hand, when a significant quality problem is expected to happen, a printing operation may be compulsorily stopped in addition to the displaying of the warning message or in place of the displaying of the warning message.

If the CPU 11 determines in S7 that the mounted ink ribbon cartridge 60 is a standard product having a standard ink ribbon set 60S (S7: Yes), the CPU 11 next judges whether or not the value of the rotation counter 13*a* is equal to or more than "1", that is, whether or not the flange 66*a* has already been rotated to read the component-ID information of the EEPROM 31 (S14). If the value of the rotation counter 13*a* is equal to or more than "1" (S14: Yes), this means that the flange 66*a* has already been rotated by about 90° at least once in S8.

Consequently, in this case (S14: Yes), the unused ink ribbon 62 on the supply side has been wastefully conveyed to the take-up side by the rotation of the flange 66*a*. Thus, the flange 66*a* is rotated in S15 in a reverse direction by a rotation angle corresponding to the angle of rotation made to read the component-ID information, and the present identification information reading processing is ended. That is, the supply-side spools 65 and 66 are rotated in a rewinding direction to rewind the ink ribbon 62 by a rotation angle that the take-up side spools 63 and 64 have been rotated in the present reading processing. Because of this operation, it is possible to rewind, to the supply side, the unused ink ribbon 62 that has been wastefully conveyed from the supply side to the take-up side to read the component-ID information. Therefore, it becomes possible to save unnecessary consumption of the ink ribbon 62 by applying the rewound unused ink ribbon 62 to printing, which enables effective use of the ink ribbon 62.

It is noted that in S15, before rotating the flange 66*a*, the rotation angle, by which the flange 66*a* should be rotated in S15 in the reverse direction, is determined by multiplying the value of the rotation counter 13*a* ("3", for instance) by the angle of 90° by which the flange 66*a* has been rotated at a time (that is, 3×90°=270°). Preferably, the rotation angle, by which the flange 66*a* should be rotated in S15 in the reverse direction, is calculated by subtracting a correction value h (that is, 3×90°−h=270°−h) by considering an error in rotation angle due to the freeplay (backlash) between coupling gears coupling the rewinding motor 35 and the flange 66*a* (supply side spool 65), a diameter difference due to the number of turns of the ink ribbon 62 wound on the supply side and the take-up side, or the like. This operation prevents a situation where the ink ribbon 62 is excessively rewound from the take-up side to the supply side, and printing is performed by reusing the ink ribbon that has already been used, thereby preventing degradation of printing quality.

In S14, if the value of the rotation counter 13*a* is "0" (S14: No), this means that the flange 66*a* has not been rotated in S8 to read the component-ID information. Therefore, in this case, it is not required to rewind the ink ribbon 62, so that S15 is skipped and the present identification information reading processing is ended.

With the construction described above, when it is impossible to obtain the information held in the EEPROM 31 through the contact terminal unit 32, the flange 66*a* is rotated by the LF motor 33 by the rotation angle of around 90° at a time. Because, the rotation angle of around 90° of the flange 66*a* is smaller than the central angle (approximately 180°) of the reading terminals 81*a* to 81*e*, the contact terminals 71*a* to 71*e* do not skip the reading terminals 81*a* to 81*e* during the rotation of the flange 66*a*, so that it is ensured that the contact terminals 71*a* to 71*e* stop at the readable position, where the contact terminals 71*a* to 71*e* contact the reading terminals 81*a* to 81*e*. Accordingly, it becomes possible to minimize the number of rotations made by the flange 66*a* to set the reading terminals 81*a* to 81*e* at the readable position. This makes possible to shorten a time required to read the component-ID information from the EEPROM 31 and to shorten a boot-up time of the facsimile apparatus 1.

Next, a release mode setting process for setting the permanent release mode or the temporary release mode will be described with reference to FIG. 10. In this embodiment, the permanent release mode or the temporary release mode is set through a remote operation by the host apparatus 100 connected to the facsimile apparatus 1 through the public telephone line 30. Note that the remote operation of the facsimile apparatus 1 from the host apparatus 100 is executed using a DTMF signal.

First, when a predetermined warning message is issued in the identification information reading processing (S13 in S24) although the mounted ink ribbon cartridge 60 is a standard product (S13), the user or a maintenance-service operator reads the apparatus-ID information (such as a serial number) affixed to the facsimile apparatus 1 and informs an operator at a call center of the apparatus-ID information Then, the operator inputs the apparatus-ID information into the host apparatus 100. Accordingly, the host apparatus 100 obtains the apparatus-ID information of the facsimile apparatus 1.

At this time, information indicating whether a trouble occurs on the facsimile apparatus 1 side or on the ink ribbon cartridge 60 side is also inputted into the host apparatus 100. As a result, the CPU 101 of the host apparatus 100 knows whether the facsimile apparatus 1 should be set in the permanent release mode or in the temporary release mode, and determines the mode specifying information. In this embodiment, the mode specifying information for specifying the permanent release mode is "10" and the mode specifying information for specifying the temporary release mode is "20".

Next, the CPU 101 of the host apparatus 100 reads the password information corresponding to the obtained apparatus-ID information from the information memory 104a, and generates total information based on the apparatus-ID information, the password information, and the mode specifying information. Then, the CPU 101 transmits the total information to the facsimile apparatus 1 that has issued a request. In more detail, if the apparatus-ID information is "500", the password information is "5", the mode specifying information for specifying the permanent release mode is "10", for instance, the total information becomes "515" that is the sum of these numbers.

The CPU 11 of the facsimile apparatus 1 judges whether or not the total information has been transmitted from the host apparatus 100 (S26). If the total information has been transmitted (S26: Yes), the CPU 11 reads the apparatus-ID information and the password information stored in the ROM 12 (S27). As described above, the total information contains the mode specifying information, so that the CPU 11 judges whether the permanent release mode or the temporary release mode should be set by obtaining the mode specifying information based on the read apparatus-ID information, the password information, and the transmitted total information (S28). In more detail, the CPU 11 subtracts the values of the apparatus-ID information and of the password information from the value of the total information transmitted from the host apparatus 100, and compares the second digit of the remaining value with a value "1" specifying the permanent release mode. If the second digit is equal to the value "1" specifying the permanent release mode (S29: Yes), the CPU 11 sets the permanent release mode (S30).

In the example described above, the total information "515" is transmitted from the host apparatus 100 to the facsimile apparatus 1. The CPU 11 of the facsimile apparatus 1 subtracts its own apparatus-ID information "500" from the received total information "515", and further subtracts the password information "5". As a result, a value "10" is obtained. Accordingly, the CPU 11 sets the permanent release mode (S29: Yes).

Figure 8:
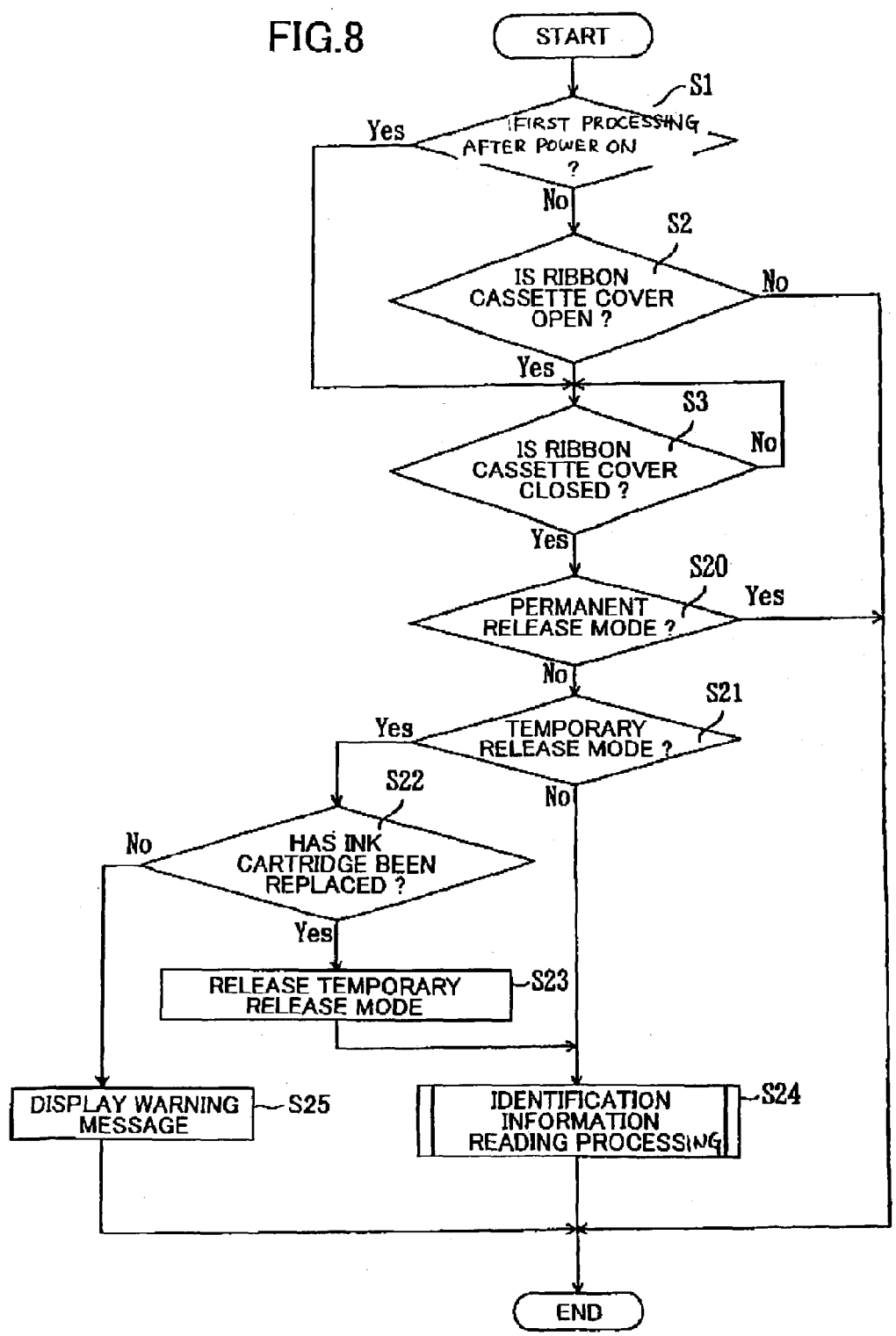
FIG. 8 is a flowchart showing the outline of an operation from power-on to an identification information reading processing.

If the processing of FIG. 8 is executed after the permanent release mode is set in this way, the judgment in S20 will be affirmative (S20: Yes), and the identification information reading processing (S24) will be skipped.

On the other hand, if the permanent release mode is not set as a result of the judgment (S29: No), the CPU 11 reads the temporary release mode setting number counter 13b to detect the number of times that the temporary release mode has been set (S31). Next, in S32, the first digit of the value obtained in S28 is compared with the number of times of setting the temporary release mode and, if the first digit is equal to the setting number (S32: Yes), the temporary release mode is set (S33) Then, a value "1", is added to the number in the temporary release mode setting number counter 13b (S34). Data of the number of times of setting the temporary release mode is transmitted from the facsimile apparatus 1 to the host apparatus 100, and is stored in the information memory 104a. Accordingly, it is possible to manage the state of each facsimile apparatus 1 at the host apparatus 100.

After the temporary release mode is set in this way, if a new ink ribbon cartridge 60 is mounted in S22 in FIG. 8, the temporary release mode will be released (S23), which makes it possible to execute the identification information reading processing (S24) in a usual manner. In more detail, if the facsimile apparatus 1 should be set in the temporary release mode for the first time, a value "525" of the total information is transmitted from the host apparatus 100 to the facsimile apparatus 1. The value "525" is the sum of the apparatus-ID information "500", the password information "5", the mode specifying information "20" for specifying the temporary release mode, and a value "0" indicating the number of times of setting the temporary release mode. Upon receipt of the total information, the CPU 11 of the facsimile apparatus 1 subtracts its own apparatus-ID information "500" from the received total information "525" and further subtracts the password information "5". As a result, the remaining value "20" is obtained. The CPU 11 judges that the permanent release mode is not specified because the second digit of the remaining value "20" is not "1" (S29: No). Further, the CPU 11 reads the number of times of setting the temporary release mode "0" from the temporary release mode setting number counter 13b (S31), and compares this value with the first digit "0" of the remaining value "20". If the first digit matches the read number (S32: Yes), the CPU 11 sets the temporary release mode (S33). Then, the temporary release mode setting number counter 13b is incremented from "0" to "1" (S34).

On the other hand, when the facsimile apparatus 1 should be set in the temporary release mode for the second time, the host apparatus 100 transmits total information "526" obtained by adding a value "1" of the temporary release mode setting number counter 13b. Accordingly, the first digit value "1" of the remaining value "21" will match the value "1" of the temporary release mode setting number counter 13b (S32: Yes). Accordingly, the facsimile apparatus 1 will be set in the temporary release mode again.

Note that in this embodiment, the host apparatus 100 transmits the total information, but the release mode setting processing may be performed based on the input of the total information ("515" or "525", for instance) by the user or the maintenance-service operator using the operation panel 4. Note that the mechanism for setting the temporary release mode by considering the number of times of setting the temporary release mode is not highly required when the total information is transmitted from the host apparatus 100 like in this embodiment. However, this mechanism is required when the user or the maintenance-service operator can set the facsimile apparatus 1 to the temporary release mode by inputting the total information into the facsimile apparatus 1. When the maintenance-service operator inputs the total information in front of the user, for instance, if the user remembers the value of the total information "525" (in this example), the user will possibly try setting the temporary release mode at any time by inputting the same value in order to use a non-standard product by setting the facsimile apparatus 1 into the temporary release mode. The temporary release mode setting mechanism using the temporary release mode setting times number can prevent such a situation. More specifically, in order to set the temporary release mode for the second time to use an ink ribbon cartridge that is not a standard product, even if the user inputs the same total information "525", the temporary release setting mode will not be set.

As described above, when the facsimile apparatus 1 is set in the temporary release mode, the identification information reading processing (S24) is not permanently prohibited, so that it is still possible to judge whether or not the ink ribbon cartridge 60 is a standard product once the temporary release mode is released later. Thus, it becomes possible to prevent a situation where a non-standard ink ribbon cartridge 60 is used and therefore printing quality is degraded or a trouble occurs to the facsimile apparatus 1.

Also, the CPU 11 sets the permanent release mode or the temporary release mode based on the apparatus-ID information and the password information. Here, different password information is set for different apparatus-ID information, and no common password information is set for different apparatus-ID information. As a result, it is possible to prevent a situation where all of the facsimile apparatuses are set in the permanent release mode or the temporary release mode easily.

The number of times of setting the temporary release mode is one parameter to judge whether or not the temporary release mode should be set. If the temporary release mode is set based only on the apparatus-ID information and the related information, when the confidential password or mode specifying information is known by the user, it is possible that the user can set the facsimile apparatus 1 in the temporary release mode at any time by inputting the apparatus-ID information and the password information and the mode specifying information (related information) into the facsimile apparatus 1. The number of times of setting the temporary release mode is used as the additional parameter to prevent such a situation.

With this construction, whether or not the facsimile apparatus should be set in the temporary release mode is judged based on three kinds of information that are the apparatus-ID information, the related information (password information and mode specifying information), and the number of times of setting the temporary release mode. Accordingly, even if the confidential related information is leaked, it is possible to prevent a situation where the temporary release mode is set easily.

Also, when the permanent release mode or the temporary release mode is set through a remote operation like in the embodiment described above, the related information that is confidential is hardly known by the user. In addition, it becomes possible to collectively manage the factors of troubles informed to the host apparatus 100 and to utilize the information for the product development in the future. Also, the maintenance-service operator is not required to visit a site where the facsimile apparatus 1 is installed.

When some trouble occurs to a facsimile apparatus 1 that reads component-identification information of an ink ribbon cartridge 60 and it is impossible to read the component-identification information even if the ink ribbon cartridge 60 is a standard product, a permanent release mode is set to permanently prohibit an identification information reading processing (S24). On the other hand, when any trouble does not occur to the facsimile apparatus 1 but some trouble occurs to the ink ribbon cartridge 60, it is impossible to read the component-identification information so long as the subject ink ribbon cartridge 60 is used. Therefore, a temporary release mode is set to temporarily prohibit the identification information reading processing (S24). Accordingly, it becomes possible to reduce an economical burden on a user and to perform a printing operation with favorable printing quality.

A modification of the ink ribbon set 160 will be now described with reference to FIG. 11 to FIG. 13(*b*). An ink ribbon set 160 includes a take-up roll core 163, a supply roll core 166, and the ink ribbon 62. The take-up side spools 63, 64 and the supply side spools 65, 66 (not shown in the drawings) are fitted into internal hollow portions at both the right and left ends of the take-up roll core 163 and the supply roll core 166. The ink ribbon set 160 is attached to the cartridge main body 61 (not shown) and is then mounted to the facsimile apparatus 1. The facsimile apparatus 1 is provided with a holder member 150 and, when the ink ribbon set 160 is mounted to the facsimile apparatus 1, the holder member 150 and a non-take-up portion 163A of the take-up side roll core 166 to be described later oppose each other.

The fundamental construction and operation of the ink ribbon set 160 are the same as those of the ink ribbon set 60S in the above described embodiment that includes the ink ribbon 62, the roll cores 62*a* and 62*b*, the take-up side spools 63 and 64, and the supply side spools 65 and 66.

Figure 11:
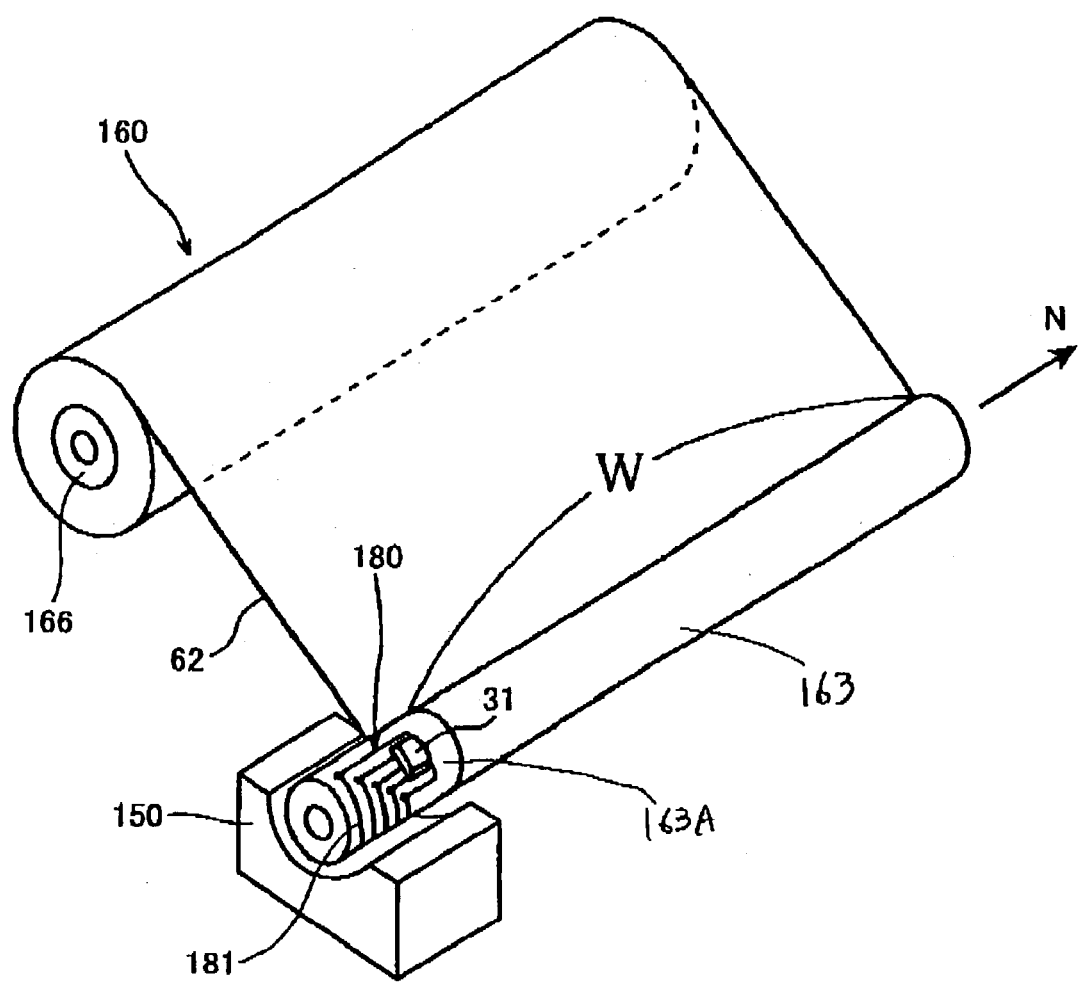
FIG. 11 is a perspective view showing an ink ribbon set in a modification of the present invention.

As shown in FIG. 11, the length of the take-up roll core 163 of the ink ribbon set 160 is longer than the width W of the ink ribbon 62. In addition, the EEPROM 31 storing the component-ID information concerning the ink ribbon set 160 is attached to the peripheral surface of the non-take-up portion 163A around which the ink ribbon 62 is not taken up. Also, the electrode pattern 180 connected to the EEPROM 31 is formed on the peripheral surface of the non-take-up portion 163A of the take-up roll core 163.

As shown in FIG. 12, the electrode pattern 180 includes a mount portion 182 composed of eight lands, onto which lead terminals (not shown) of the EEPROM 31 are soldered, and five reading terminals 181*a* to 181*e* (terminal portion 181) that are respectively connected to five line electrodes 183 connected to the mount portion 182. The reading terminals 181*a* to 181*e* are electrically connected to the EEPROM 31 in the same manner as the reading terminals 81*a* to 81*e* in the embodiment described above.

Also, the reading terminals 181*a* to 181*e* are connected to the line electrodes 183 at their start point portions 181*a*0 to 181*e*0. Note that the reading terminals 181*d* and 181*e* are connected to each other through the line electrodes 183. A resist film 184 is formed to cover portions on the electrode pattern 180, that is, the portions other than the lands of the mount portion 182 and the reading terminals 181*a* to 181*e* for the insulation purpose.

The start point portions 181*a*0 to 181*e*0 of the reading terminals 181*a* to 181*e* are arranged on a line with predetermined intervals in a direction n that is inclined by a predetermined angle θ with reference to the center axis N of the take-up roll core 163. The reading terminals 181*a* to 181*e* extend in a circumferential direction on the peripheral surface of the non-take-up portion 163A so as to start from the start point portions 181*a*0 to 181*e*0. The reading terminals 181*a* to 181*e* extend to have a length corresponding to a central angle of approximately 180° around the center axis N of the take-up roll core 163. In addition, each of the reading terminals 181*a* to 181*e* has approximately the same length. Accordingly, end point portions of the reading terminals 181*a* to 181*e* (not shown) are also arranged on a line with predetermined intervals in the direction n that is inclined by the predetermined angle θ with reference to the center axis N.

With this construction, the reading terminals 181*a* to 181*e* and the line electrodes 183 do not intersect and contact each other. Note that it is sufficient that the reading terminals 181*a* to 181*e* and the line electrodes 183 are arranged so as not to contact each other. Therefore, it is not necessarily required that the reading terminals 181*a* to 181*e* are arranged on the line in the direction n that is inclined by the predetermined angle θ with reference to the center axis N of the take-up roll core 163.

Figure 13A:
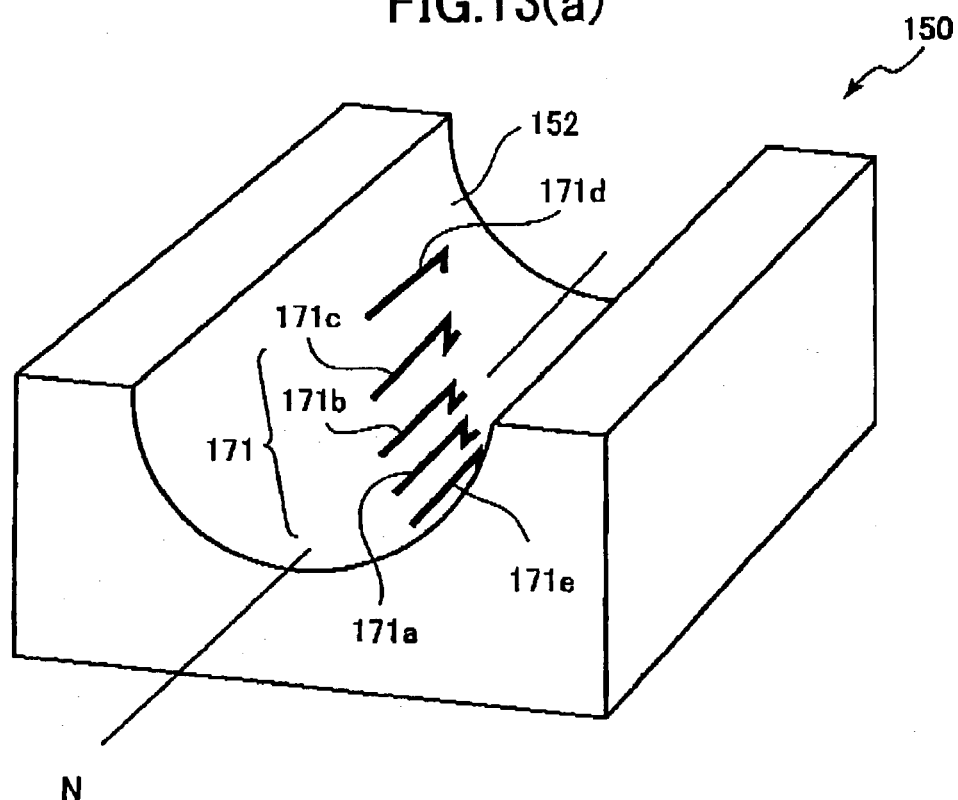
FIG. 13(a) is a perspective view of a holder member.
Figure 13B:
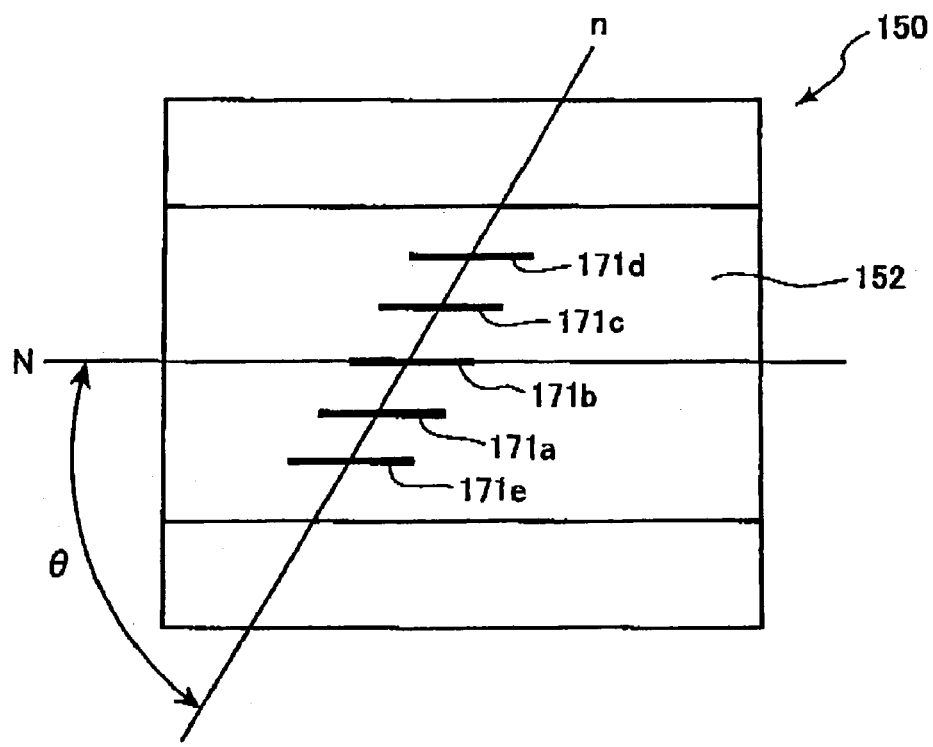
FIG. 13(b) is a top view of the holder member.

As shown in FIGS. 11 and 13(*a*), the holder member 150 has a box shape whose top surface has a concave portion 152 having a semicircular cross section. On the curved surface of the concave portion 152, five contact terminals 171*a* to 171*e* are arranged. The construction of each of the contact terminals 171*a* to 171*e* is approximately the same as the construction shown in FIG. 6(*b*) of the contact terminals 71*a* to 71*e* in the embodiment described above. The radius of the curved surface of the concave portion 152 is greater than the radius of the take-up roll core 163 by a predetermined length. Accordingly, when the ink cartridge is mounted, a predetermined amount of space is formed between the curved surface of the concave portion 152 and the take-up roll core 163 and the five contact terminals 171*a* to 171*e* are brought into press-contact with the peripheral surface of the take-up roll core 163.

As shown in FIG. 13(*b*), the five contact terminals 171*a* to 171*e* are arranged on a line on the curved surface of the concave portion 152 in the direction n that is inclined by the predetermined angle θ with reference to the center axis N. This is because the start point portions 181*a*0 to 181*e*0 of the reading terminals 181*a* to 181*e* are arranged in the direction that is inclined by the predetermined angle θ with reference to the center axis N. In more detail, the contact portions, at which the contact terminals 171*a* to 171*e* contact the reading terminals 181*a* to 181*e*, are arranged on the line in the direction n. With this construction, even if the take-up roll core 163 is rotated, a contact state is maintained between the reading terminals 181*a* to 188*e* and their corresponding contact terminals 171*a* to 171*e*. The contact terminals 171*a* to 171*e* are not necessarily required to be arranged on the line in the direction n and it is sufficient that these terminals are arranged to maintain the contact state with the reading terminals 181*a* to 181*e*.

When the take-up roll core 163 is driven by the LF motor 33, the contact terminals 171*a* to 171*e* slide on the peripheral surface of the non-take-up portion 163A of the take-up roll core 163. At this time, only while these contact terminals are sliding on the peripheral surface of the non-take-up portion 163A by about 180° from a predetermined rotational position, the contact terminals 171*a* to 171*e* contact the reading terminals 181*a* to 181*e* and the EEPROM 31 and the CPU 11 are electrically connected to each other. Therefore, during this operation, it is possible to read the component-ID information from the EEPROM 31. On the other hand, while the contact terminals 171*a* to 171*e* are sliding on the peripheral surface of the non-take-up portion 163A by the remaining angle of about 180°, the contact terminals 171*a* to 171*e* do not contact the reading terminals 581*a* to 181*e* and the EEPROM 31 and the CPU 11 are not electrically connected to each other. Therefore, during this operation, it is impossible to read the component-ID information. This is the same as when the ink ribbon set 60S in the embodiment described above is used.

Accordingly, the ink ribbon set 160 in this modification provides the same effects as the ink ribbon set 60S in the embodiment described above.

According to the above-described embodiment, component-ID information is stored in the EEPROM 31 of the ink ribbon set 60S, and the facsimile apparatus 1 reads out the component-ID information from the EEPROM 31 and analyzes the component-ID information. The component-ID information may be prepared to include not only a serial number but also various kinds of information concerning the ink ribbon set 60S, such as a manufacture lot number, a date of manufacture, a name of a manufacturing factory, a line number, and characteristic values of ink and an ink ribbon.

Further, the EEPROM 31 may store any information of the ink ribbon set 60S. The facsimile apparatus 1 reads out the information from the EEPROM 31 and analyzes the information and informs the user of the information. Consequently, the user can learn necessary information concerning the ink ribbon set 60S. That is, the CPU 11 may analyze the information (characteristic value of an ink ribbon, for example) in the above-mentioned judgment step of S7 instead of judging whether or not the ink ribbon set 60S is a standard product and display a result of the analysis in S13.

It is noted that after a standard ink ribbon set 60S is provided to the user, it is possibly found later that the quality of the standard ink ribbon set 60S is inferior. Even in such a case, the facsimile apparatus 1 of the above-described embodiment can inform the user that the ink ribbon set 60S is defective. It is now assumed that a specification of a standard ink ribbon set 60S is changed and that it is found later that the product with the new specification has inappropriate quality (melting temperature of ink, for example). In such a case, the facsimile apparatus 1 of the embodiment can inform the user of this fact.

More specifically, when it is found that the subject ink ribbon set 60S has inferior quality, a maintenance-service operator manually operates the facsimile apparatus 1 to write in the ROM 12 reference data indicating that the subject ink ribbon set 60S is defective. When the defective ink ribbon set 60S is mounted to the facsimile apparatus 1 thereafter, the facsimile apparatus 1 will inform the user that the mounted ink ribbon set 60S is defective in S13. It is noted that the reference data may be inputted into the ROM 12 by a remote control from the host apparatus 100.

Also, in the embodiment described above, the component-ID information is read using a so-called contact-type construction where the contact terminals 71*a* to 71*e* are brought into contact with the reading terminals 81*a* to 81*e* formed on an end surface of the right-side supply side spool 66. However, the present invention is not necessarily limited to the contact type construction. For instance, the component-ID information may be read from the barcode information printed on the external surface of the supply side spool or from a magnetic sheet contained inside the supply side spool using a non-contact sensor such as an optical sensor or a magnetic sensor. Even in this case, like in the embodiment described above, it is possible to prevent unnecessary consumption of the ink ribbon 62 by rewinding the ink ribbon 62 by the length corresponding to the length of the ink ribbon 62 conveyed to read the component-ID information.

Also, in the embodiment described above, it is judged whether or not the mounted ink ribbon cartridge 60 is a standard product when the facsimile apparatus 1 is just turned on or when the ink ribbon cartridge cover is just closed. However, the present invention is not necessarily limited to this timing. For instance, prior to the start of the printing operation that is to be executed first after the power-on, it may be judged whether or not the mounted ink ribbon cartridge 60 is a standard product. With this construction, like in the manner described in the embodiment, it is possible to detect whether or not the ink ribbon cartridge 60 is a standard product with reliability even if the ink ribbon cartridge 60 has been mounted during power off. Thus, it becomes possible to prevent degradation of printing quality, damage of the thermal head 50, and the like.

Further, in the embodiment described above, there has been explained a case where the component-ID information is read from the EEPROM 31, and no specific description has been made for a case where some information is written into the EEPROM 31. However, it is also possible that some information may be written into the EEPROM 31. For instance, when the ink ribbon 62 is consumed to its trailing end as a result of printing, a notification showing this situation (running-out information) may be written into the EEPROM 31. In this case, it becomes possible to judge whether or not the mounted ink ribbon cartridge 60 has already been used up based on the running-out information written into the EEPROM 31, which makes it possible to prevent degradation of printing quality, damage of the thermal head 50, or the like resulting from a situation where the ink ribbon 62 that has already reached its trailing end is rewound and reused.

Also, in the embodiment described above, the operation for conveying the ink ribbon 62 and the operation for rewinding the ink ribbon 62 are controlled using two motors is that are the LF motor 33 and the rewinding motor 35. However, the ink ribbon conveying operation and the ink ribbon rewinding operation may be controlled using a single motor.

Also, in the embodiment described above, in order to input the apparatus-ID information of the facsimile apparatus 1 into the host apparatus 100, the user or the maintenance-service operator reads the apparatus-ID information (such as a serial number) of the facsimile apparatus 1 and informs an operator at a call center of the apparatus-ID information. However, the facsimile apparatus 1 may communicate with the host apparatus 100 using some communication protocol and transmit its own apparatus-ID information to the host apparatus 100.

Also, in the embodiment described above, the password information set for each facsimile apparatus 1 is collectively stored in the information memory 104a of the hard disk 104 of the host apparatus 100. However, the host apparatus 100 may obtain the password information from the apparatus-ID information using a predetermined calculation rule every time the host apparatus 100 receives the apparatus-ID information from the facsimile apparatus 1.

Also, in the embodiment described above, the number of times of setting the temporary release mode is used as the additional parameter to set the temporary release mode. However, this additional parameter is not limited to the number of times of setting the temporary release mode and may be information related to time, for instance. In more detail, the facsimile apparatus 1 may be provided with an RTC (real time clock) circuit for measuring the current time. Information concerning various times, such as a time at which the user sends information to the host apparatus 100 to request the host apparatus 100 to send total information to the facsimile apparatus 1 or a time at which the release mode setting processing is started, may be used as the additional parameter. Even in this case, like in the case described above, when the temporary release mode setting process is executed for the second time or more, even if only the related information (password information and mode specifying information) and the apparatus-ID information are inputted, the setting of the temporary release mode is prevented by the additional parameter. As a result, it becomes possible to prevent a situation where the temporary release mode is set multiple times inappropriately.

Also, in the embodiment described above, there has been explained a case where the processing for setting the release mode of the facsimile apparatus 1 is executed through a remote operation by the host apparatus 100. However, a maintenance-service operator may visit a site, at which the facsimile apparatus 1 is installed, and manually conduct this release mode setting processing. Also, the user may arbitrarily set the release mode. In this case, the facsimile apparatus may be modified so that the user can easily set the permanent release mode or the temporary release mode without inputting the apparatus-ID information, the password information, the mode specifying information, or the number of times of setting the temporary release mode.

While some exemplary embodiments of this invention have been described in detail, those skilled in the art will recognize that there are many possible modifications and variations which may be made in these exemplary embodiments while yet retaining many of the novel features and advantages of the invention.

In the embodiment described above, the ink ribbon cartridge is used as a printing component. However, a printing component receiving a consumable item such as an ink cartridge for an ink jet printer or a toner cartridge for a laser printer may also be used. Also, in the embodiment described above, the facsimile apparatus 1 is used as the image forming apparatus of the present invention. However, the image forming apparatus is not limited to this and may be a printer, a copier, or a multifunction device having functions thereof.

As described above, the image forming apparatus and the ink ribbon set according to the present invention are widely applicable to a facsimile apparatus, a printer, a copier, or the like to which there is mounted a printing component receiving a consumable item, such as a replaceable ink ribbon cartridge, an ink cartridge for an ink jet printer, or a toner cartridge for a laser printer, and which forms an image on a recording medium using ink supplied from the printing component. The image forming apparatus and the ink ribbon set according to the present invention are widely applicable to office and home uses.

What is claimed is:
1. An ink ribbon set comprising:
an ink ribbon coated with ink;
a rotary spool around which the ink ribbon is wound; and
an information holding portion that is provided on the rotary spool, the information holding portion including a nonvolatile memory storing predetermined information and a reading terminal formed on a surface of the rotary spool and connected to the nonvolatile memory, the reading terminal being formed on the surface of the rotary spool by a central angle α around a rotational axis of the rotary spool, the central angle α being smaller than 360°.

2. An ink ribbon set as claimed in claim 1, wherein the predetermined information is information related to the ink ribbon set.

3. An ink ribbon set as claimed in claim 1, wherein the reading terminal is formed in an arc shape on a surface of an end portion of the rotary spool that is defined in an axial direction of the rotary spool.

4. An ink ribbon set as claimed in claim 1, wherein the reading terminal extends in a circumferential direction on an outer peripheral surface of the rotary spool.

5. An ink ribbon cartridge comprising:
a holder; and
an ink ribbon set detachably mounted on the holder, the ink ribbon set including:
an ink ribbon coated with ink;
a rotary spool around which the ink ribbon is wound; and
an information holding portion that is provided on the rotary spool, the information holding portion including a nonvolatile memory storing predetermined information and a reading terminal formed on a surface of the rotary spool and connected to the nonvolatile memory, the reading terminal being formed on the surface of the rotary spool by a central angle α around a rotational axis of the rotary spool, the central angle α being smaller than 360°.

6. An image forming apparatus comprising:
an ink ribbon set including:
an ink ribbon coated with ink;
a rotary spool around which the ink ribbon is wound; and
an information holding portion that is provided on the rotary spool, the information holding portion including a nonvolatile memory storing predetermined information and a reading terminal formed on a surface of the rotary spool and connected to the nonvolatile memory, the reading terminal being formed on the surface of the rotary spool by a central angle α around a rotational axis of the rotary spool, the central angle α being smaller than 360°;
a driving portion of rotating the rotary spool to convey the ink ribbon of the ink ribbon set in a forward direction;
an image forming portion forming an image on a recording medium using the ink ribbon conveyed by the driving portion;
an obtaining portion that is disposed opposing the rotary spool and obtains the information from the information holding portion;
a determining unit performing judgment based on the information obtained by the obtaining portion; and
a rewinding portion rotating, when the driving portion has rotated the rotary spool in the forward direction to let the obtaining portion obtain the information, the rotary spool in a reverse direction to rewind the ink ribbon by a rewinding length that corresponds to a winding length of the ink ribbon conveyed by the forward rotation.

7. An image forming apparatus comprising:
a mount portion to which an ink ribbon set is detachably mounted, the ink ribbon set including an ink ribbon coated with ink, a rotary spool around which the ink ribbon is wound, and an information holding portion that is provided on the rotary spool and holds information of the ink ribbon set;
a driving portion of rotating the rotary spool to convey the ink ribbon of the ink ribbon set in a forward direction;
an image forming portion forming an image on a recording medium using the ink ribbon conveyed by the driving portion;
an obtaining portion that is disposed opposing the rotary spool and obtains the information from the information holding portion;
determining unit performing judgment based on the information obtained by the obtaining portion; and
a rewinding portion rotating, when the driving portion has rotated the rotary spool in the forward direction to let the obtaining portion obtain the information, the rotary spool in a reverse direction to rewind the ink ribbon by a rewinding length that corresponds to a winding length of the ink ribbon conveyed by the forward rotation.

8. An image forming apparatus as claimed in claim 7, wherein the determining unit determines whether or not the ink ribbon set is a standard product that satisfies a predetermined standard.

9. An image forming apparatus as claimed in claim 7, wherein:
the information holding portion includes a nonvolatile memory storing information related to the ink ribbon set and a reading terminal provided on a surface of the rotary spool and connected to the nonvolatile memory;
the obtaining portion includes a contact terminal disposed opposing the surface of the rotary spool;
the contact terminal is capable of maintaining a contact state with the reading terminal while the rotary spool rotates; and
the obtaining portion obtains the information from the nonvolatile memory via the contact terminal and the reading terminal which are in the contact state.

10. An image forming apparatus as claimed in claim 9, wherein the reading terminal is formed on the surface of the rotary spool to extend by a central angle α around an axis line of the rotary spool.

11. An image forming apparatus as claimed in claim 10, wherein the driving portion includes:
a rotating portion rotating the rotary spool by a rotation angle β at a time;
a first judging unit judging whether or not the obtaining portion has obtained the information from the information holding portion;
a second judging unit judging the number of β-angle rotation times the rotating portion has rotated the rotary spool by the rotation angle β; and
a rotation control portion controlling the rotating portion to rotate the rotary spool by the rotation angle β when the information held by the information holding portion is not yet obtained by the obtaining portion and when the number of β-angle rotation times is less than a predetermined number of times,
wherein the central angle α and the rotation angle α are both smaller than 360°.

12. An image forming apparatus as claimed in claim 11, wherein the determining unit determines that the ink ribbon set is not a standard product, when the obtaining portion fails to obtain the information held by the information holding portion even after the rotary spool has been rotated by the rotating portion by the rotation angle β for the predetermined number of times.

13. An image forming apparatus as claimed in claim 11, wherein the rotation angle β is smaller than the central angle α.

14. An image forming apparatus as claimed in claim 10, wherein the reading terminal is exposed on a surface of an end portion of the rotary spool that is defined in an axial direction of the rotary spool.

15. An image forming apparatus as claimed in claim 10, wherein the reading terminal is exposed on an outer peripheral surface of the rotary spool.

16. An image forming apparatus as claimed in claim 9, wherein the contact terminal is resiliently deformable in a direction away from the reading terminal, and pressingly contacts the reading terminal using an resilient restoration force that is generated when the contact terminal contacts the reading terminal and deformed by the reading terminal.

17. An image forming apparatus as claimed in claim 7, wherein the obtaining portion obtains the information from the information holding portion in a non-contact manner.

18. An image forming apparatus as claimed in claim 7, wherein the driving portion rotates the rotary spool in the forward direction when the obtaining portion fails to obtain the information from the information holding portion.

19. An image forming apparatus as claimed in claim 7, wherein the rewinding length is equal to or less than the winding length.

20. An image forming apparatus as claimed in claim 7, further comprising a notifying portion issuing a notification showing that the determining unit determines that the ink ribbon set is not a standard product.

21. An image forming apparatus comprising:
a receiving portion detachably receiving a printing component, the printing component having a printing medium and being provided with a portion having information of the printing component;
a printing portion forming an image on a recording medium using the printing medium supplied from the printing component;
a judging unit detecting the information and performing a judgment based on a result of the detection;
an error operation unit executing an error processing selectively based on the judgment result; and
a mode setting unit setting a first prohibiting mode, in which the judging unit is prohibited from executing the judgment, thereby setting the error operation unit inoperable.

22. An image forming apparatus as claimed in claim 21, wherein:
the printing component is provided with a portion having component-identification information identifying whether or not the printing component is a standard product;
the judging unit detects the component-identification information and determines whether or not the printing component is a standard product based on a result of the detection; and
the error operation unit executes an error processing when the judging unit determines that the printing component is not a standard product.

23. An image forming apparatus as claimed in claim 21, wherein the mode setting unit further sets a second prohibiting mode, in which the judging unit is temporarily prohibited from executing the judgment thereby temporarily setting the error operation unit inoperable.

24. An image forming apparatus as claimed in claim 23, further comprising:
an information storage portion storing apparatus-identification information and password information that is associated with the apparatus-identification information, the apparatus-identification information distinguishing the image forming apparatus from other image forming apparatuses; and
an input unit receiving input of total information;
a setting unit setting one of the first prohibiting mode and the second prohibiting mode based on the apparatus-identification information and the password information when the input unit receives the total information.

25. An image forming apparatus as claimed in claim 24, wherein the input unit includes a communication unit that performs bi-directional communication with a host apparatus and obtains the total information from the host apparatus, the host apparatus storing the apparatus-identification information and the password information for the image forming apparatus, the host apparatus generating the total information based on the apparatus-identification information, the password information, and mode specifying information indicative of a selected one of the first prohibiting mode and the second prohibiting mode.

26. An image forming apparatus as claimed in claim 24, wherein the setting unit sets the second prohibiting mode based on additional information in addition to the apparatus-identification information, the password information, and the mode specifying information.

27. An image forming apparatus as claimed in claim 26, wherein the additional information is a number of times the second prohibiting mode has been set.

28. An image forming apparatus as claimed in claim 26, wherein the additional information is information related to time at which the host apparatus has been requested to send the total information to the communication unit.

29. An image forming apparatus as claimed in claim 21, wherein the error operation unit includes a notifying unit issuing a notification showing a result of the judgment to a user.

30. An image forming apparatus as claimed in claim 21 wherein:
the printing medium is an ink ribbon to which an ink having a thermally melting property has been applied; and
the printing component is an ink cartridge including a supply spool around which the ink ribbon is wound, a take-up spool that takes up the ink ribbon supplied from the supply spool, and a case member that rotatably supports the take-up spool and the supply spool.

* * * * *